(12) United States Patent
Kusakari

(10) Patent No.: US 9,301,090 B2
(45) Date of Patent: Mar. 29, 2016

(54) LIGHT DEVICE, COMMUNICATION UNIT AND POSITIONAL INFORMATION MANAGEMENT SYSTEM

(71) Applicant: Shin Kusakari, Kanagawa (JP)

(72) Inventor: Shin Kusakari, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 80 days.

(21) Appl. No.: 13/905,382

(22) Filed: May 30, 2013

(65) Prior Publication Data

US 2013/0330085 A1    Dec. 12, 2013

(30) Foreign Application Priority Data

Jun. 12, 2012   (JP) ................................. 2012-133297

(51) Int. Cl.

| | |
|---|---|
| H04B 10/00 | (2013.01) |
| H04W 4/02 | (2009.01) |
| H04B 10/2575 | (2013.01) |
| H04B 10/114 | (2013.01) |
| H04W 4/04 | (2009.01) |
| H04J 14/02 | (2006.01) |

(52) U.S. Cl.
CPC ............. *H04W 4/02* (2013.01); *H04B 10/1143* (2013.01); *H04B 10/25752* (2013.01); *H04B 10/25753* (2013.01); *H04B 10/25758* (2013.01); *H04W 4/043* (2013.01); *H04J 14/0298* (2013.01)

(58) Field of Classification Search
CPC ............ H04B 10/116; H04B 10/1149; H04B 10/1143; H04B 10/40; H04B 10/00; H04B 10/11; H04Q 11/0062; H04Q 11/0071; H04Q 2011/0064; H04W 40/02; H04W 84/18; H04W 4/02; H04W 4/043

USPC .......................................................... 398/115
See application file for complete search history.

(56) References Cited

U.S. PATENT DOCUMENTS 6,600,899 B1 *   7/2003   Radomsky et al. .......... 455/3.05
7,557,521 B2 *   7/2009   Lys ............................... 315/294

(Continued)

FOREIGN PATENT DOCUMENTS

| JP | 2005-158007 | 6/2005 |
|---|---|---|
| WO | 2005/086375 A1 | 9/2005 |

OTHER PUBLICATIONS

U.S. Appl. No. 13/795,383, filed Mar. 12, 2013.

(Continued)

*Primary Examiner* — Ken Vanderpuye
*Assistant Examiner* — Amritbir Sandhu
(74) *Attorney, Agent, or Firm* — Harness, Dickey & Pierce, P.L.C.

(57) ABSTRACT

A light device includes a light source that irradiates light to the outside; a positional information transmission part that transmits positional information of the light device to a wireless terminal; a terminal information reception part that receives identification information of the wireless terminal and the positional information from the wireless terminal that has received the positional information; a terminal information transmission part that transmits the identification information and the positional information to a management server that manages a position of the wireless terminal; and a voltage conversion part that converts a voltage of power supplied from an external power source and supplies the power to the positional information transmission part, the terminal information reception part and the terminal information transmission part.

2 Claims, 21 Drawing Sheets

(56) References Cited

U.S. PATENT DOCUMENTS

| | | | |
|---|---|---|---|
| 7,583,901 B2* | 9/2009 | Nakagawa et al. | 398/183 |
| 8,280,398 B2* | 10/2012 | Ishii et al. | 455/456.1 |
| 8,503,886 B1* | 8/2013 | Gunasekara et al. | 398/172 |
| 8,571,411 B2* | 10/2013 | Pederson et al. | 398/115 |
| 8,588,135 B2* | 11/2013 | Wang et al. | 370/328 |
| 2003/0118216 A1* | 6/2003 | Goldberg | 382/115 |
| 2004/0044709 A1* | 3/2004 | Cabrera et al. | 708/191 |
| 2006/0214815 A1* | 9/2006 | Komatsu | H04B 10/1143 340/956 |
| 2007/0066323 A1* | 3/2007 | Park et al. | 455/456.2 |
| 2007/0145915 A1* | 6/2007 | Roberge et al. | 315/312 |
| 2007/0160373 A1* | 7/2007 | Biegelsen et al. | 398/118 |
| 2007/0177161 A1* | 8/2007 | Ishii et al. | 356/614 |
| 2008/0014992 A1* | 1/2008 | Pescod | H01Q 1/246 455/562.1 |
| 2008/0227463 A1* | 9/2008 | Hizume et al. | 455/456.1 |
| 2008/0247758 A1* | 10/2008 | Nichols | G01S 5/16 398/115 |
| 2008/0292320 A1* | 11/2008 | Pederson | 398/128 |
| 2008/0317475 A1* | 12/2008 | Pederson et al. | 398/135 |
| 2010/0310258 A1* | 12/2010 | Wang et al. | 398/115 |
| 2011/0010090 A1* | 1/2011 | Bae et al. | 701/208 |
| 2011/0069962 A1* | 3/2011 | Castor et al. | 398/115 |
| 2011/0268446 A1* | 11/2011 | Cune | H04B 10/25753 398/79 |
| 2012/0189313 A1* | 7/2012 | Pederson | H04B 10/1143 398/115 |
| 2013/0234893 A1* | 9/2013 | Kusakari | G01S 1/08 342/386 |
| 2013/0316729 A1* | 11/2013 | Ohashi | H04W 4/02 455/456.1 |
| 2013/0324123 A1* | 12/2013 | Ianev | H04W 4/005 455/435.1 |
| 2013/0328893 A1* | 12/2013 | Kusakari | G09G 5/005 345/520 |
| 2013/0329423 A1* | 12/2013 | Kusakari | F21V 33/00 362/234 |
| 2013/0330085 A1* | 12/2013 | Kusakari | H04W 4/02 398/115 |
| 2014/0086587 A1* | 3/2014 | Roberts | H04B 10/116 398/115 |
| 2014/0087710 A1* | 3/2014 | Kusakari | H04W 64/006 455/418 |
| 2014/0087766 A1* | 3/2014 | Kusakari | H04W 4/043 455/456.6 |
| 2014/0155098 A1* | 6/2014 | Markham | H04B 1/0064 455/456.3 |
| 2014/0191682 A1* | 7/2014 | Pederson | H04B 10/1149 315/294 |
| 2014/0270791 A1* | 9/2014 | Hyde | H04B 10/116 398/118 |
| 2015/0097689 A1* | 4/2015 | Logue | G08B 25/10 340/632 |
| 2015/0237481 A1* | 8/2015 | Ben-Moshe | H04W 4/043 455/456.1 |
| 2015/0280823 A1* | 10/2015 | Breuer | H04B 10/1149 398/25 |

OTHER PUBLICATIONS

U.S. Appl. No. 13/784,961, filed Mar. 5, 2013.

* cited by examiner

FIG.15

| FLOOR NUMBER | LATITUDE | LONGITUDE | BUILDING NUMBER |
|---|---|---|---|
| 16 | 35.459555 | 139.387110 | C |

FIG.16

| FLOOR NUMBER | LATITUDE | LONGITUDE | BUILDING NUMBER |
|---|---|---|---|
| 16 | 35.459555 | 139.387110 | C |

FIG.17

| FLOOR NUMBER: 9 BITS | LATITUDE: 21 BITS | LONGITUDE: 21 BITS | BUILDING NUMBER: 8 BITS |
|---|---|---|---|

FIG.18

| IDENTIFICATION INFORMATION | LATITUDE | LONGITUDE | FLOOR NUMBER | BUILDING | RECEIVED DATE AND TIME | APPARATUS NAME | DEPARTMENT |
|---|---|---|---|---|---|---|---|
| 002673abcdef01 | 35.459555 | 139.387110 | 16 | C | 11/12/12 13:30:01 | PJ WX4310 | SALES DEPT. 1 |
| 002673abcdef02 | 35.459483 | 139.388437 | 4 | A | 11/12/12 13:30:03 | UCS P3000 | SALES DEPT. 1 |
| .. | .. | .. | .. | .. | .. | .. | |
| .. | .. | .. | .. | .. | .. | .. | |

FIG.20

| LOCATION SEARCH SYSTEM | | |
|---|---|---|
| DEPARTMENT | APPARATUS NAME | |
| SALES DEPT. 1 | PJ WX4310 | |
| | UCS P3000 | |
| | .. | |
| | .. | |
| SALES DEPT. 2 | PJ WX3231N No.1 | |
| | PJ WX3231N No.2 | |
| | PJ WX3231N No.3 | |

SEARCH EXECUTION

LIGHT DEVICE, COMMUNICATION UNIT AND POSITIONAL INFORMATION MANAGEMENT SYSTEM

BACKGROUND OF THE INVENTION

1. Field of the Invention

The present invention relates to a light device, a communication unit and a positional information management system.

2. Description of the Related Art

Various positional information management systems have been proposed to determine and manage the position of a wireless terminal, or a person or a thing which has a wireless terminal, in such a facility or the like in which it is difficult to accurately carry out positioning using GPS or the like.

In such a positional information management system, a plurality of transmitters for transmitting positional information to the wireless terminals are installed on the ceiling of a room or the like for example. However, for this purpose, new power supply installation work is needed for supplying the power to the transmitters, and thus, the introduction cost may be increased.

International Patent Publication No. 2005/086375 discloses a system in which the position of the wireless terminal is determined as a result of the wireless terminal receiving unique information from a light device and transmitting the unique information to a server. According to the system of International Patent Publication No. 2005/086375, communication with the wireless terminal is made available using the power supplied to the light device as a result of providing the light device with a function of transmitting the unique information to the wireless terminal. Thus, it is not necessary to carry out new power supply installation work at a time of introducing the system.

However, power consumption in the wireless terminal may be increased depending on the communication system employed between the wireless terminal and the server according to the system of International Patent Publication No. 2005/086375. Further, the server needs to search for the position associated with the unique information in order to determine the position of the wireless terminal, and the calculation cost may be thus increased.

SUMMARY OF THE INVENTION

According to one embodiment of the present invention, a light device includes a light source that irradiates light to the outside; a positional information transmission part that transmits positional information of the light device to a wireless terminal; a terminal information reception part that receives identification information of the wireless terminal and the positional information from the wireless terminal that has received the positional information; a terminal information transmission part that transmits the identification information and the positional information to a management server that manages a position of the wireless terminal; and a voltage conversion part that converts a voltage of power supplied from an external power source and supplies the power to the positional information transmission part, the terminal information reception part and the terminal information transmission part.

Other objects, features and advantages of the present invention will become more apparent from the following detailed description when read in conjunction with the accompanying drawings.

BRIEF DESCRIPTION OF THE DRAWINGS

FIG. 15 shows an example of information that the light device according to the first embodiment has;

FIG. 16 shows an example of information that the wireless terminal according to the first embodiment has;

FIG. 17 shows an example of a format of positional information that the wireless terminal according to the first embodiment transmits;

FIG. 18 shows an example of information that the management server according to the first embodiment has;

FIG. 20 shows an example of a search screen page of the management server according to the first embodiment;

DETAILED DESCRIPTION OF THE EMBODIMENTS

Below, the embodiments will be described using the figures, in the order of "1. System", "2. Hardware Configuration Example", "3. Function" and "4. Operational Sequence".

(1. System)

Figure 1:
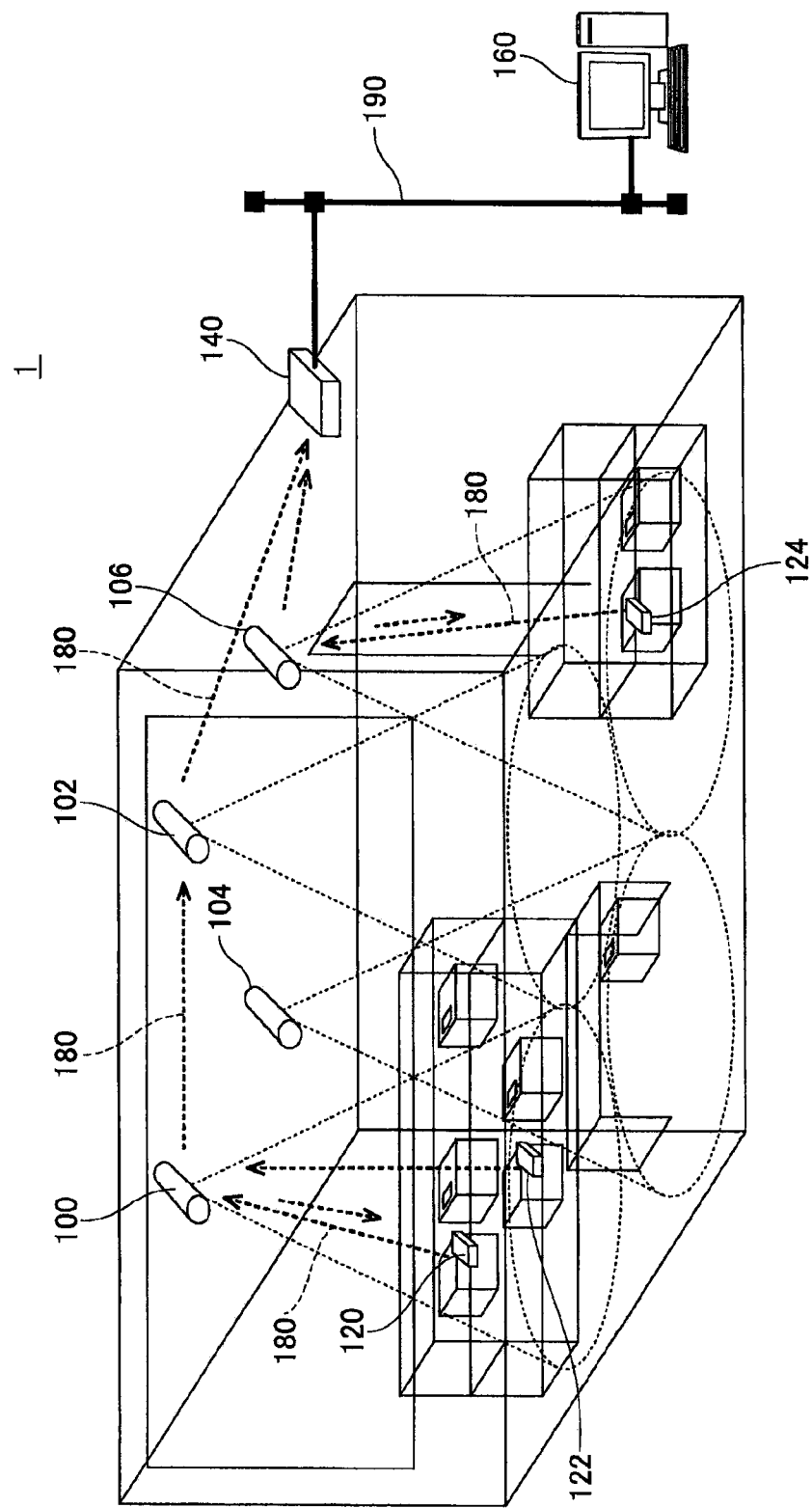
FIG. 1 shows a positional information management system according to a first embodiment.
Figure 2:
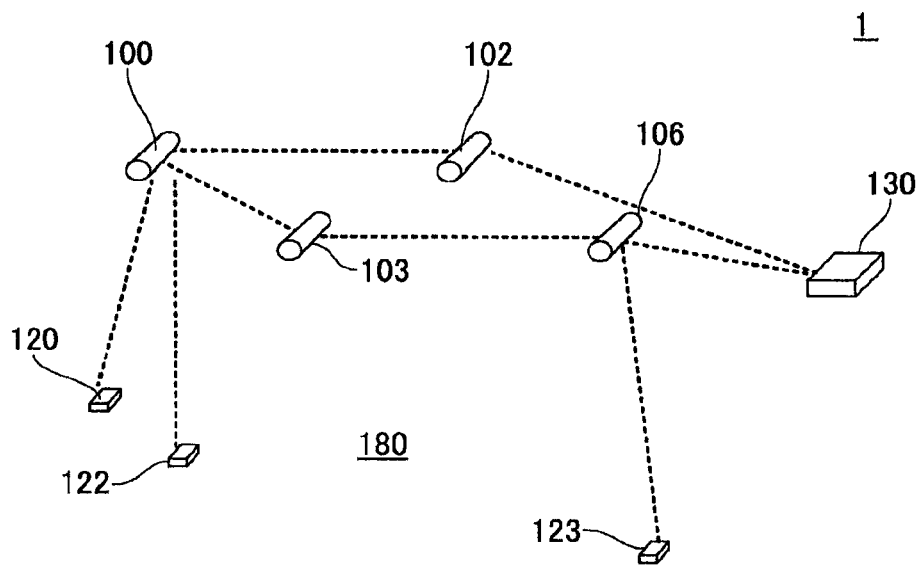
FIG. 2 shows a network included in the positional information management system according to the first embodiment.

FIG. 1 shows a positional information management system 1 according to the first embodiment. As shown in FIG. 1, the positional information management system 1 according to the first embodiment includes lighting fixtures 100, 102, 104 and 106; wireless terminals 120, 122 and 124; a management apparatus 140; and a management server 160. Further, the positional information management system 1 includes a network 180 including the lighting fixtures 100, 102, 104 and 106, the wireless terminals 120, 122 and 124 and the management apparatus 140; and a network 190. The network 180 is a wireless network managed by the management apparatus 140. FIG. 2 shows the lighting fixtures 100, 102, 104 and 106, the wireless terminals 120, 122 and 124 and the management apparatus 140 included in the wireless network 180 extracted from FIG. 1.

The lighting fixtures 100, 102, 104 and 106 are mounted, for example, on a ceiling of a room, and continuously or intermittently transmit, in a wireless manner, respective sets of positional information of themselves (hereinafter, simply referred to as "positional information") such as longitude and latitude information, a building number and a floor number of a building and/or the like concerning the position at which the corresponding one of the lighting fixtures 100, 102, 104 and 106 is installed. The lighting fixtures 100, 102, 104 and 106 thus transmit the respective sets of positional information, which the lighting fixtures 100, 102, 104 and 106 respectively have, to predetermined areas, using wireless signals, respectively. The predetermined areas are limited by the signal strengths of the used wireless signals, respectively. The lighting fixtures 100, 102, 104 and 106 are placed at positions to cover the zones that are targets to manage positions, respectively, and the zones are defined so that they do not overlap each other. Alternatively, even in a case where the zones may overlap each other, a configuration may be provided such that each part that receives the positional information can identify the corresponding lighting fixture based on the strength of the received radio waves. In the example of FIG. 1, conical broken lines shown below the respective lighting fixtures 100, 102, 104 and 106 show the predetermined areas. As the communication method to transmit the positional information, for example, an indoor messaging system (IMES) may be used.

The wireless terminals 120, 122 and 124 can receive the wireless signals transmitted by the nearest ones of the lighting fixtures 100, 102, 104 and 106, respectively. In the example of FIG. 1, the respective wireless terminals 120, 122 and 124 are attached to management targets having shapes of rectangular parallelepipeds for which the positions are to be managed, respectively. The wireless terminals 120, 122 and 124 are terminals that can transmit radio waves by themselves, and thus, are, for example, terminals such as active tags. Below, the wireless terminal 120 will be described as a typical one of the wireless terminals 120, 122 and 124. Each of the other wireless terminals 122 and 124 has generally the same configuration as that of the wireless terminal 120.

The wireless terminal 120 is within an area of being able to receive the wireless signal from the lighting fixture 100, and therefore receives the positional information of the lighting fixture 100. Receiving the positional information of the lighting fixture 100 may be carried out by using IMES, for example. The wireless terminal 120 transmits information including its own identification information such as a network address to the lighting fixture 100 together with the received positional information. The transmitting is carried out using the network 180 that is according to short-range wireless communication such as IEEE 802.15.4 and ZigBee (registered trademark). In this case, as the identification information of the wireless terminal 120, a short address as specified in IEEE 802.15.4 or an IEEE extended (MAC) address may be used. The identification information and the positional information thus transmitted to the lighting fixture 100 are then transmitted to the management apparatus 140 via the adjacent lighting fixture 102. It is noted that the transmitting and receiving operations of the wireless terminal 120 are carried out in timing predetermined for the wireless terminal 120 or in timing when a change in the acceleration at the wireless terminal 120 has been detected by an acceleration sensor that the wireless terminal 120 has.

The management apparatus 140 connects the network 180 and the network 190 together, and sends data transmitted from the network 180 to the network 190 by bridging therebetween. The management apparatus 140 is installed, for example, on each floor of the building, or in each room separated by walls or the like. In a case where the network 180 is a personal area network (PAN) according to IEEE 802.15.4 and ZigBee (registered trademark) and the network 190 is a local area network (LAN) based on the IEEE 802.3 standard, the communication system is converted therebetween. Further, in a case where the identification information of the wireless terminal 120 is expressed by a short address as specified in IEEE 802.15.4, this is converted into the IEEE extended address based on the information used at the time of configuring the PAN, and then, the identification information is transmitted to the management server 160.

The management server 160 records the identification information and the positional information thus received via the management apparatus 140 together with the received date and time, and manages the positions of the corresponding ones of the lighting fixtures 100, 102, 104 and 106. In the management server 160, the management targets concerning the wireless terminals 120, 122 and 124, respectively, are previously recorded. Thus, by using the recorded information, the management server 160 can search for the locations (whereabouts) of the management targets.

That is, by thus managing the sets of identification information of the wireless terminals 120, 122 and 124 and the sets of positional information of the nearest ones of the lighting fixtures 100, 102, 104 and 106 to be associated with each other, respectively, the management server 160 can provide information indicating that the respective positions of the management targets (corresponding to the wireless terminals 120, 122 and 124) correspond to the positions of the lighting fixtures which are thus managed to be associated with the wireless terminals 120, 122 and 124 (corresponding to the respective management targets). For example, by managing the identification information of the wireless terminal 120 and the positional information of the lighting fixture 100 to be associated with each other, the management server 160 can provide information indicating that the position of the management target to which the wireless terminal 120 is attached corresponds to the position of the lighting fixture 100.

The network 180 is, for example, the PAN that meets the IEEE 802.15.4 and ZigBee (registered trademark) standards, which connects the respective lighting fixtures 100, 102, 104 and 106, wireless terminals 120, 122 and 124 and management apparatus 140. In the case where the PAN is configured according to the IEEE 802.15.4 and ZigBee (registered trademark) standards, the wireless terminals 120, 122 and 124, the lighting fixtures 100, 102, 104 and 106 and the management apparatus 140 have end device functions, router functions and a coordinator function defined by the ZigBee (registered trademark) standard, respectively. Then, the respective lighting fixtures 100, 102, 104 and 106 and wireless terminals 120, 122 and 124 come under the control of the management apparatus 140 at a time of being started up, and form the PAN, and minimum paths (routes) thereof to the management apparatus 140 are determined.

The network 190 is a network connecting the management apparatus 140 and the management server 160, and is, for example, a LAN defined by IEEE 802.3 standard.

As mentioned above, in the positional information management system 1 according to the first embodiment, the wireless terminals 120, 122 and 124 can transmit the identification information and the positional information to the management server 160 using power only for being able to communicate with the nearest ones of the lighting fixtures 100, 102, 104 and 106, respectively. Further, the communication functions for communicating with the wireless terminals 120, 122 and 124 and the management apparatus 140 are provided in the lighting fixtures 100, 102, 104 and 106, respectively. Thus, it is not necessary to install a new infrastructure for supplying the power required for the communication functions, and thus, it is possible to reduce the introduction cost.

It is noted that it is also possible to transmit the positional information of the lighting fixtures 100, 102, 104 and 106 using the network 180. Thereby, the transmitting system such as IMES for transmitting the positional information becomes unnecessary.

Further, in a case where the management apparatus 140 exists nearer to the wireless terminal 120 than to the lighting fixture 100 that has transmitted the positional information thereto, the wireless terminal 120 may transmit the identification information and the positional information rather to the management apparatus 140 directly. Thereby, it is possible to transmit the identification information and the positional information to the management server 160 using the shortest path (route).

Further, it is also possible to integrate the function of the management apparatus 140 to the management server 160. Thereby, the separate management apparatus 140 becomes unnecessary.

The wireless terminals 120, 122 and 124 may be wireless terminals having functions equal to active tags such as smartphones, PDAs, PCs or smart meters. Thereby, it is possible to manage the positional information of the existing wireless terminals without attaching tags thereto.

Further, in addition to the above-mentioned positional information, it is also possible to include information for determining a finer position such as information indicating one of divisions inside a room. Thereby, it is possible to carry out more refined position management.

Further, the management targets may be persons. Thereby, it is possible to manage the locations (whereabouts) of the persons by the system 1.

Further, the network 180 may be configured using short-range wireless communication such as Bluetooth, LE, ANT, Z-Wave or the like. Thereby, it is possible to manage the positional information of various wireless terminals.

Further, the network 190 may include plural networks such as the Internet, for example. Thereby, it is possible to manage the positional information of the wireless terminals without regard to the physical positional relationship between the network 180 and the management server 160.

(2. Hardware Configuration Example)

Next, the hardware configurations of the lighting fixture 100, the wireless terminal 120, the management apparatus 140 and the management server 160 included in the positional information management system 1 will be described.

Figure 3:
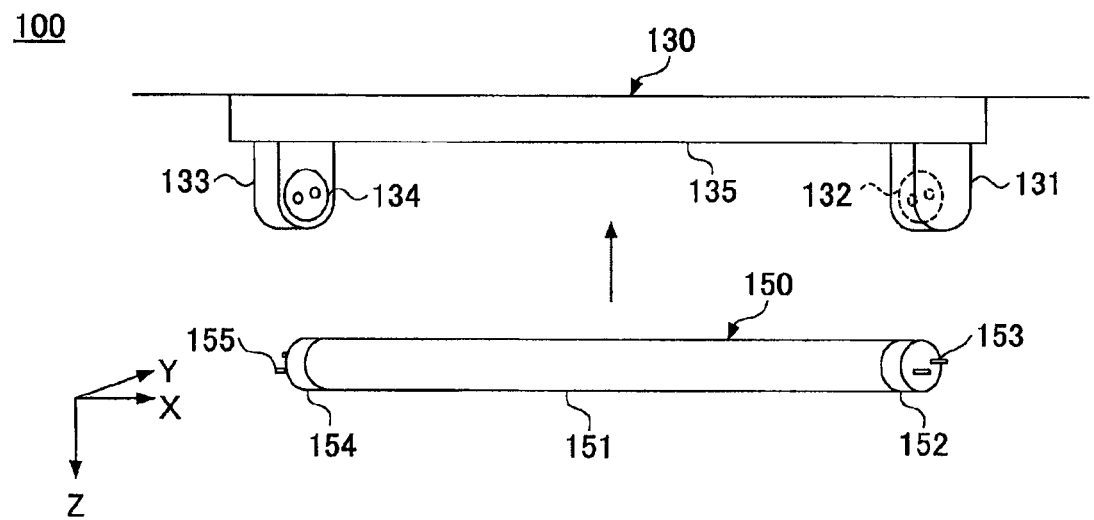
FIG. 3 illustrates an external appearance of a lighting fixture according to the first embodiment.

FIG. 3 illustrates an external appearance of the lighting fixture 100 according to the first embodiment. It is noted that the hardware configuration of the lighting fixture 100 will now be described as a typical example of the lighting fixtures 100, 102, 104 and 106, and each of the other lighting fixtures 102, 104 and 106 has generally the same hardware configuration as the lighting fixture 100. As shown in FIG. 3, a light device 150 is a straight-tube-type lamp, and is mounted in a lighting fixture body 130.

The lighting fixture body 130 is installed onto, for example, the ceiling of the room. The lighting fixture body 130 includes a body 135 installed onto the ceiling or the like; a first socket 131 and a second socket 133 to which the ends of the light device 150 are mounted, respectively. The first socket 131 has a power supply terminal 132 for supplying the power to the light device 150. The second socket 133 has a power supply terminal 134 for supplying the power to the light device 150. The lighting fixture body 130 supplies the power to the light device 150, the two ends of which are mounted on the first socket 131 and the second socket 133, respectively, from a power supply part 218 (see FIG. 5 described later) provided inside, via the power supply terminals 132 and 134. It is noted that the lighting fixture body 130 may be configured in such a manner that a fluorescent lamp having another shape, for example, a spherical shape, is mounted therein.

The light device 150 has a translucent cover 151, metal cap parts 152 and 154 provided at the ends, connection terminals 153 and 155, and light sources inside. The translucent cover 151 is made of a resin material such as an acrylic resin and is formed to cover the light sources inside. The metal cap parts 152 and 154 are mounted on the first socket 131 and the second socket 133 of the lighting fixture body 130, respectively. The connection terminals 153 and 155 are connected to the power supply terminals 132 and 134 when the light device 150 is mounted in the lighting fixture body 130, and receive the supplied power. The light sources provided inside the light device 150 emit light by the power supplied from the connection terminals 153 and 155, and irradiate the light to the outside via the translucent cover 151.

Figure 4:
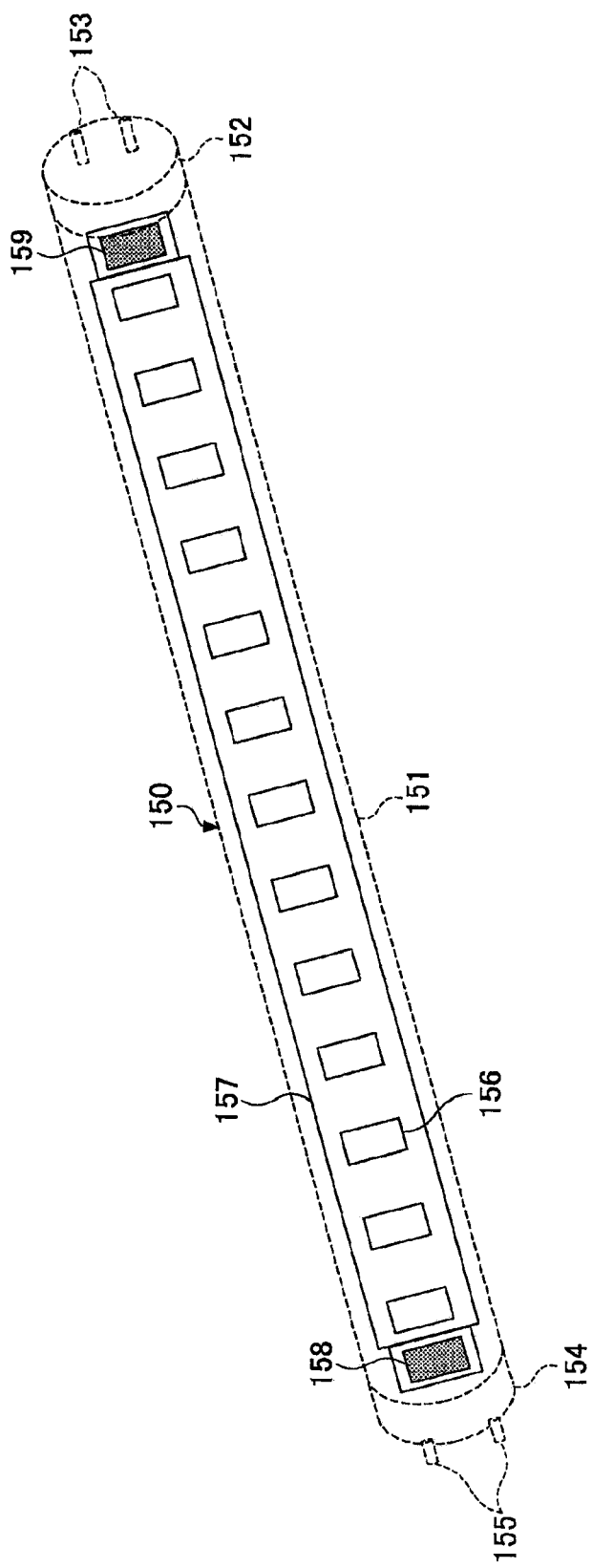
FIG. 4 illustrates a general configuration of a light device according to the first embodiment.

FIG. 4 illustrates a general configuration of the light device 150 according to the first embodiment. The light device 150 has a substrate 157 on which LED elements 156 (light sources) are mounted, as one example of a light emitting module, and irradiates light from the LED elements 156 to the outside. The plurality of LED elements 156 are arranged on one side of the substrate 157. The substrate 157 is mounted in the light device 150 in such a manner that when the light device 150 is mounted in the lighting fixture body 130, the side on which the LED elements 156 are mounted face the room inside from the body 135, for example. It is noted that as the light sources, it is possible to thus employ semiconductor light emitting devices such as the LED elements, EL elements or the like. Further, although the light device 150 according to the first embodiment has the shape of the straight tube type, the shape of the light device 150 is not limited thereto. For example, the light device 150 may have another shape such as a spherical shape. The shape of the substrate 157, the arrangement and/or the number of the LED elements 156, and so forth, may be appropriately determined depending on the shape of the light device 150.

Inside the light device 150, a positional signal transmitter 158 and a wireless communication device 159 are provided. The positional signal transmitter 158 is a device including an antenna that transmits a positioning signal of IMES or the like, and transmits the positional signal (positioning signal) indicating the positional information of the light device 150 or the like to the wireless terminal 120. The wireless communication device 159 is a device including an antenna capable of transmitting and receiving radio waves that are in conformity with, for example, IEEE 802.15.4 standard. The wireless communication device 159 receives, from the wireless terminal 120 that has received the positional signal, the identification information of the wireless terminal 120 and the positional information, and transmits the received identification information and positional information to the management server 160 that manages the position of the wireless terminal 120 via the management apparatus 140.

Figure 5:
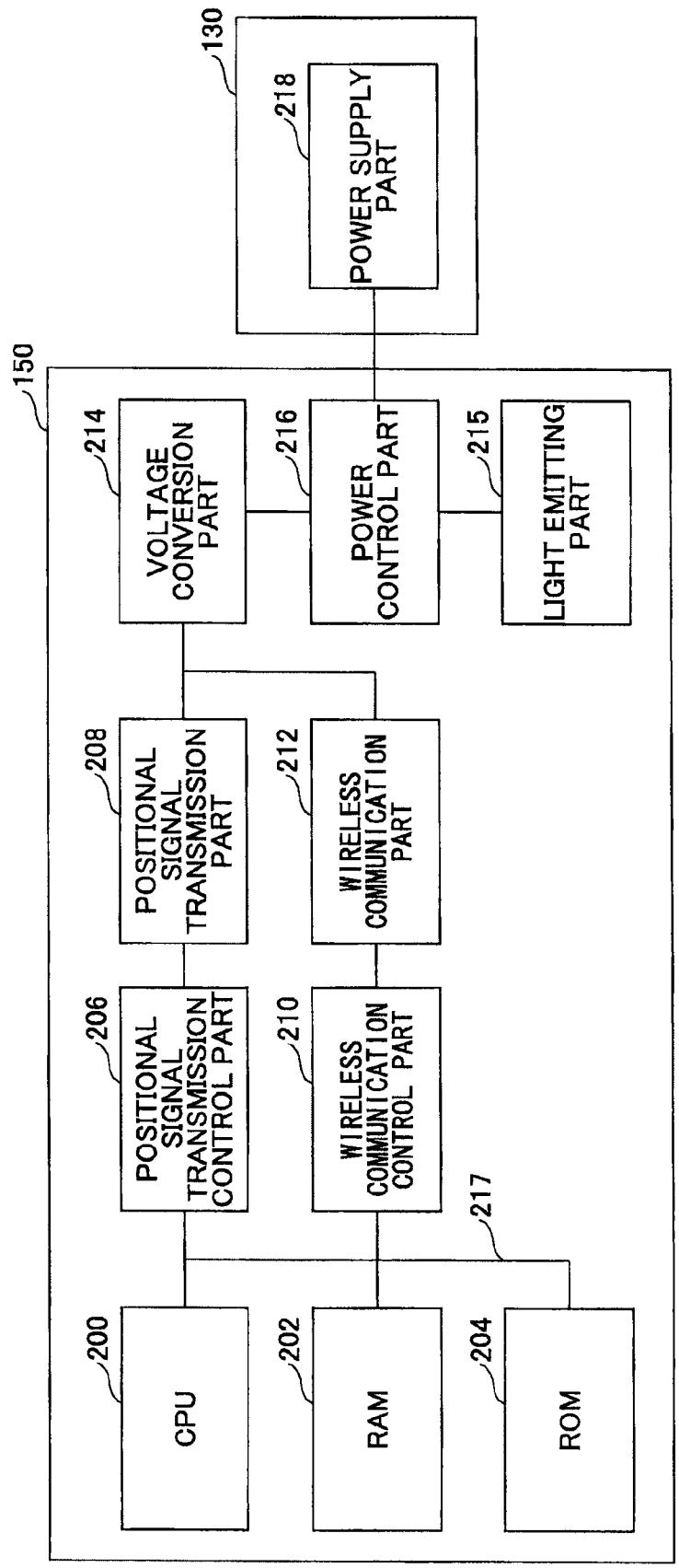
FIG. 5 is a hardware configuration diagram of the lighting fixture according to the first embodiment.

FIG. 5 shows a hardware configuration of the lighting fixture 100 according to the first embodiment. The light device 150 of the lighting fixture 100 includes a CPU 200, a RAM 202, a ROM 204, the positional signal transmission control part 206, the positional signal transmission part 208, the wireless communication control part 210, a wireless communication part 212, the voltage conversion part 214, a light emitting part 215, the power control part 216 and a bus 217.

The CPU 200 executes a program prepared for carrying out control of the operations of communication and so forth of the light device 150. The RAM 202 provides a work area for the CPU 200, or the like. The ROM 204 stores the program that the CPU 200 executes and the positional information of the lighting fixture 100. The positional signal transmission control part 206 carries out a process for transmitting the positioning signal (positional signal) indicating the positional information of the lighting fixture 100 via the positional signal transmission part 208. The positional signal transmission part 208 is the positional signal transmitter 158 shown in FIG. 4. The wireless communication control part 210 carries out a wireless communication process using the wireless communication part 212. The wireless communication part 212 is the wireless communication device 159 shown in FIG. 4. The voltage conversion part 214 includes, for example, a DC-DC converter, and converts the voltage of the power supplied by the power control part 216 into the voltage to be used for operating the positional signal transmission part 208 and the wireless communication part 212. The light emitting part 215 is the substrate 157 shown in FIG. 4 on which the LED elements 156 are provided (installed). The power control part 216 includes, for example, a smoothing circuit and a current monitoring circuit, and converts the supplied power into one suitable to operate the light emitting part 215. The bus 217 electrically connects the above-mentioned respective parts/devices.

By the above-mentioned configuration, the light device 150 according to the first embodiment can transmit the positional information to the wireless terminal 120, receive the identification information and the positional information from the wireless terminal 120 and transmit the identification information and positional information to the management server 160 via the management apparatus 140.

Figure 6:
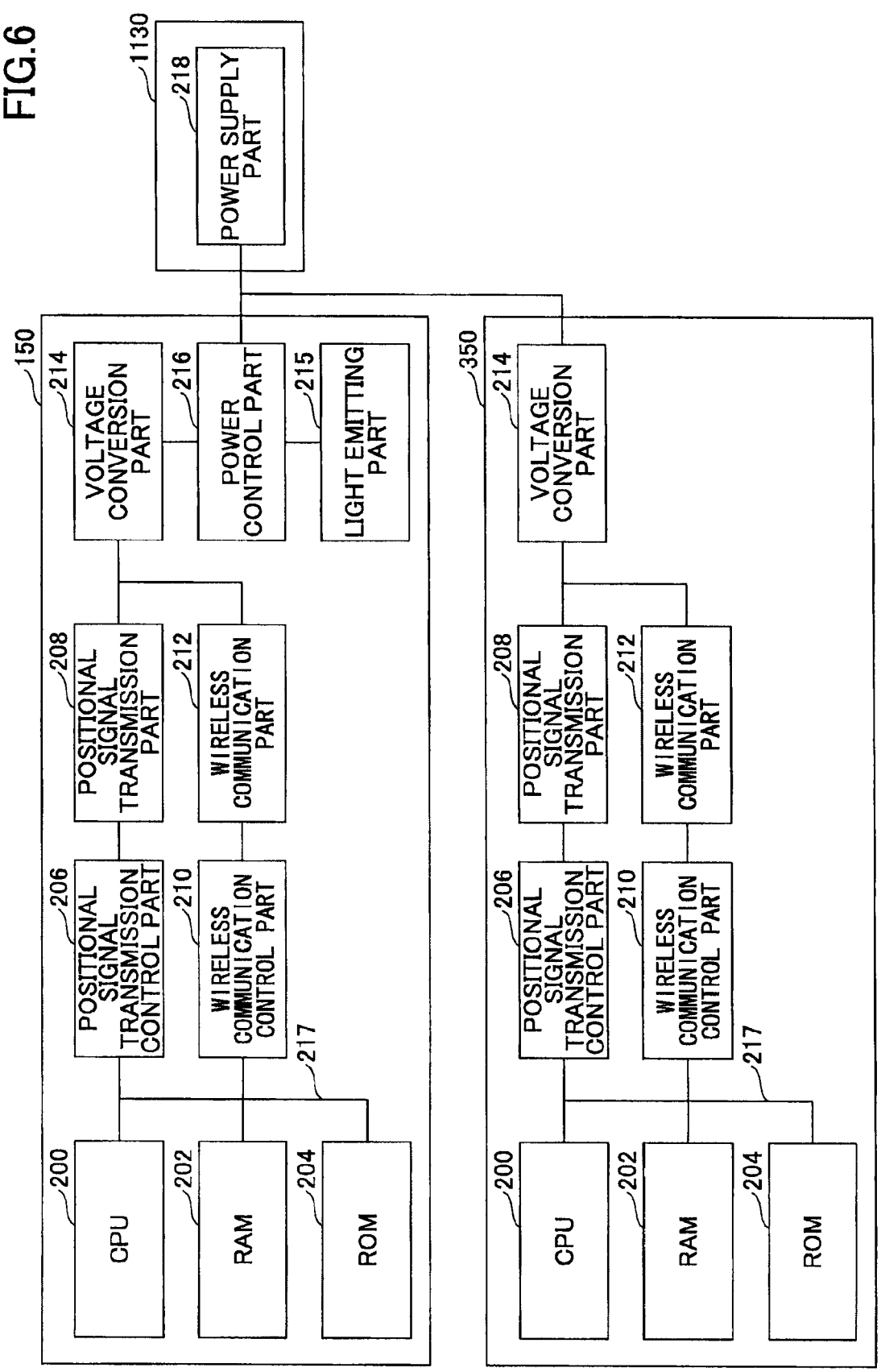
FIG. 6 is a hardware configuration diagram of the lighting fixture according to a first variant of the first embodiment.
Figure 23:
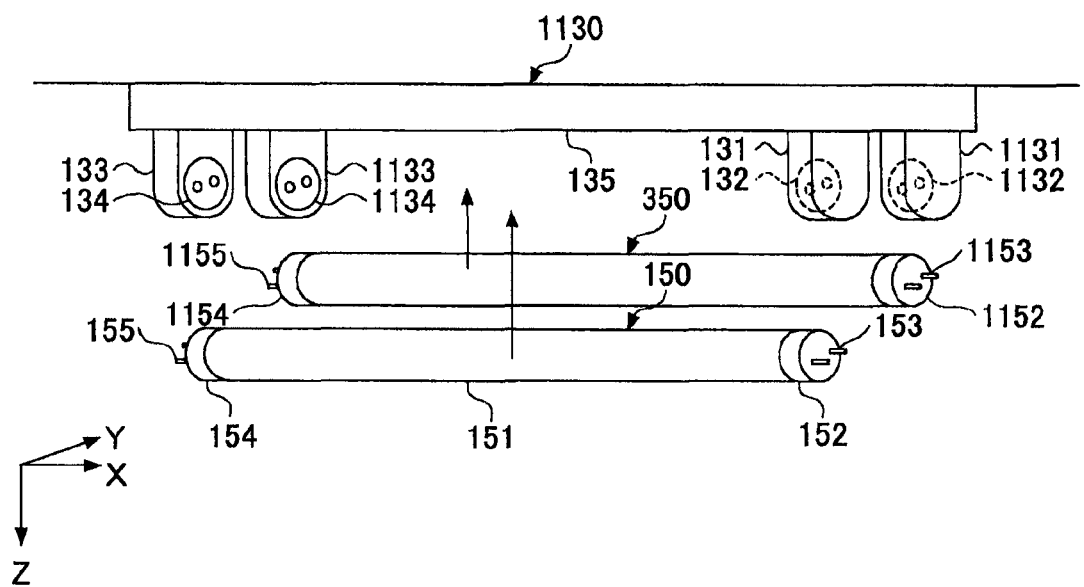
FIG. 23 illustrates an external appearance of a lighting fixture according to the first variant of the first embodiment.

It is noted that in a case where the lighting fixture body 130 has a structure such that two or more of the light devices 150 can be mounted therein, the light device 150 and a communication unit 350 may be mounted in the lighting fixture body, as shown in FIGS. 6 and 23. In this case (the first variant of the first embodiment), as shown in FIG. 23, the lighting fixture body will be referred to as a "lighting fixture body 1130" for the first variant.

As shown in FIG. 23, the communication unit 350 has a structure corresponding to the light device 150, and has metal cap parts 1152, 1154 and connection terminals 1153, 1155, which correspond to the metal cap parts 152, 154 and the connection terminals 153, 155 of the light device 150, respectively. Correspondingly, the lighting fixture body 1130 has first and second sockets 1131, 1133 and power supply terminals 1132, 1134, which correspond to the first and second sockets 131, 133 and power supply terminals 132, 134 of the light device 150, respectively. Thus, in the same way as that of the light device 150 as mentioned above, the communication unit 350 is mounted in the lighting fixture body 1130 while the connection terminals 1153, 1155 are connected with the power supply terminals 1132, 1134, respectively. Thus, the power is supplied to the communication unit 350 via the power supply terminals 1132, 1134 and the connection terminals 1153, 1155, from a power supply part 218 of the lighting fixture body 1130.

As shown in FIG. 6, the communication unit 350 includes a CPU 200, a RAM 202, a ROM 204, a positional signal transmission control part 206, a positional signal transmission part 208, a wireless communication control part 210, a wireless communication part 212, a voltage conversion part 214 and a bus 217. The functions of the respective parts are the same as those of the light device 150.

Figure 7:
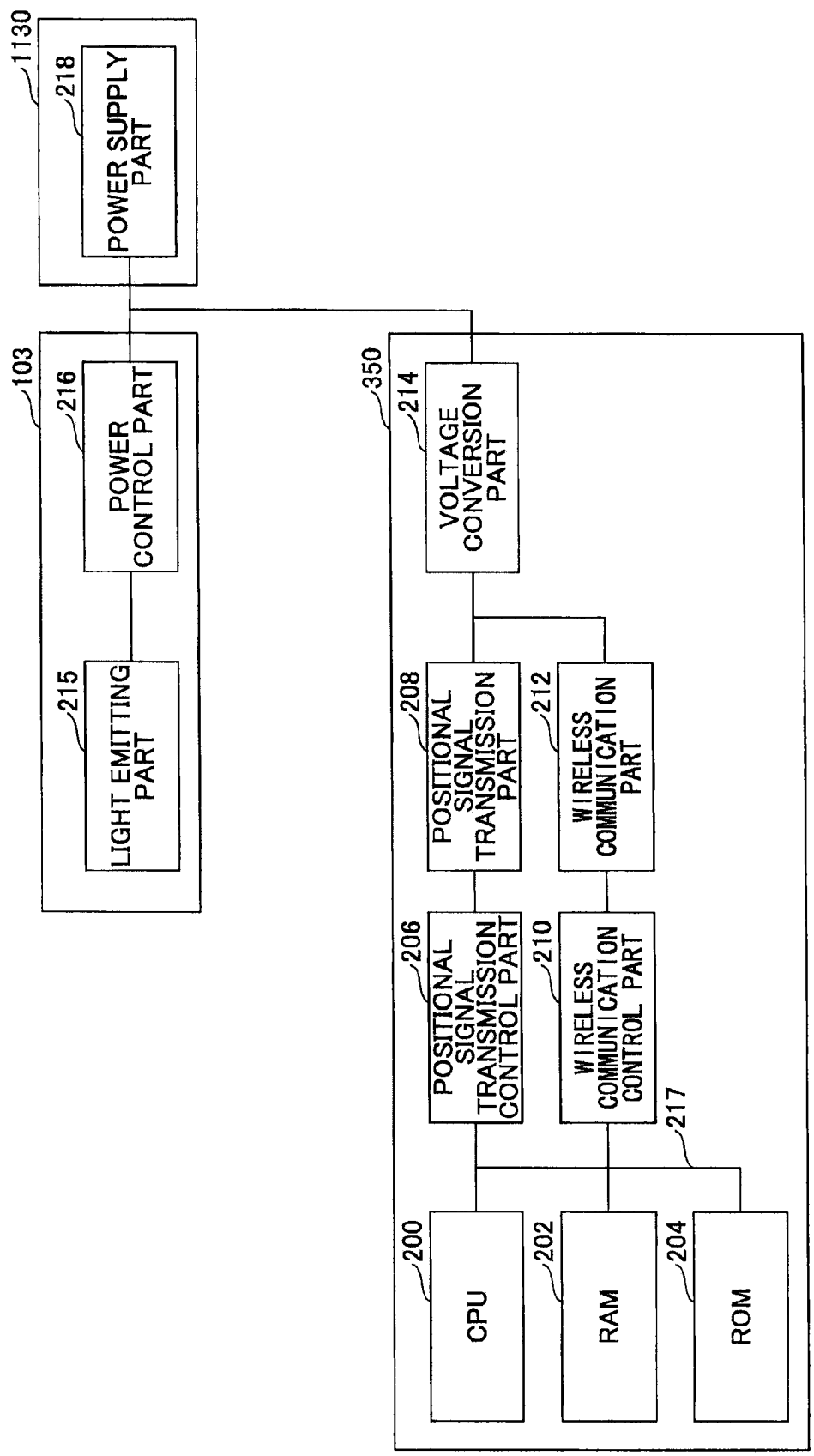
FIG. 7 is a hardware configuration diagram of the lighting fixture according to a second variant of the first embodiment.
Figure 24:
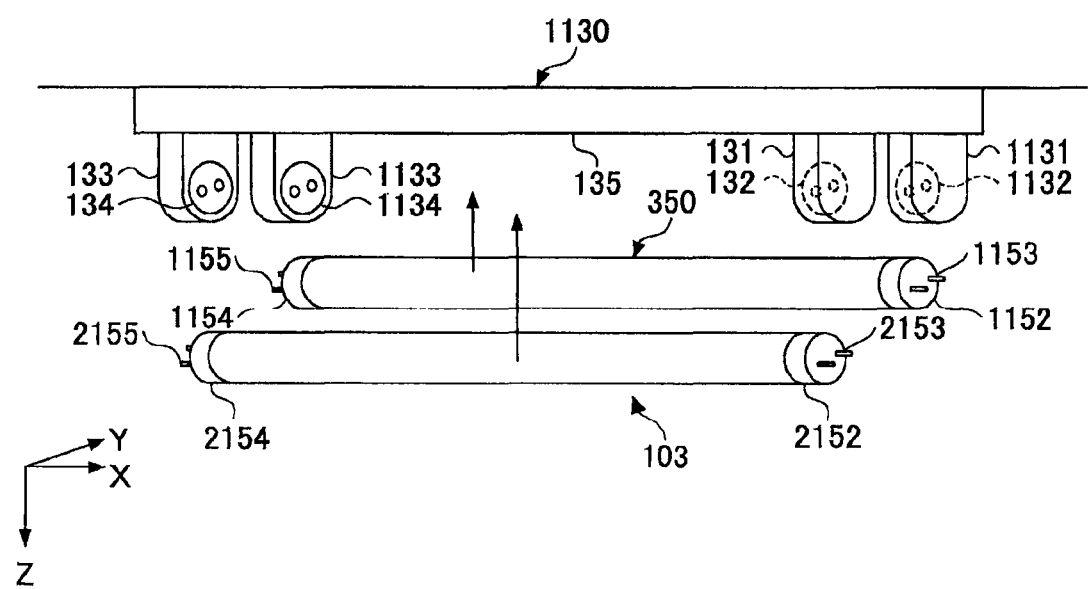
FIG. 24 illustrates an external appearance of a lighting fixture according to the second variant of the first embodiment.

Further, as shown in FIGS. 7 and 24, a lamp 103 that does not have a communication function may be mounted at one place of the lighting fixture body 1130, and the communication unit 350 may be mounted at the other place of the lighting fixture body 1130.

In this case (the second variant of the first embodiment), as shown in FIG. 24, the lamp 103 has a structure corresponding to the light device 150, and has metal cap parts 2152, 2154 and connection terminals 2153, 2155, which correspond to the metal cap parts 152, 154 and the connection terminals 153, 155 of the light device 150, respectively. Thus, in the same way as that of the light device 150 as mentioned above, the lamp 103 is mounted in the lighting fixture body 1130 while the connection terminals 2153, 2155 are connected with the power supply terminals 132, 134, respectively. Thus, the power is supplied to the lamp 103 via the power supply terminals 132, 134 and the connection terminals 2153, 2155, from the power supply part 218 of the lighting fixture body 1130. As shown in FIG. 7, the lamp 103 has a power control part 216 and a light emitting part 215 which have the same functions as those of the light device 150, respectively.

Figure 25:
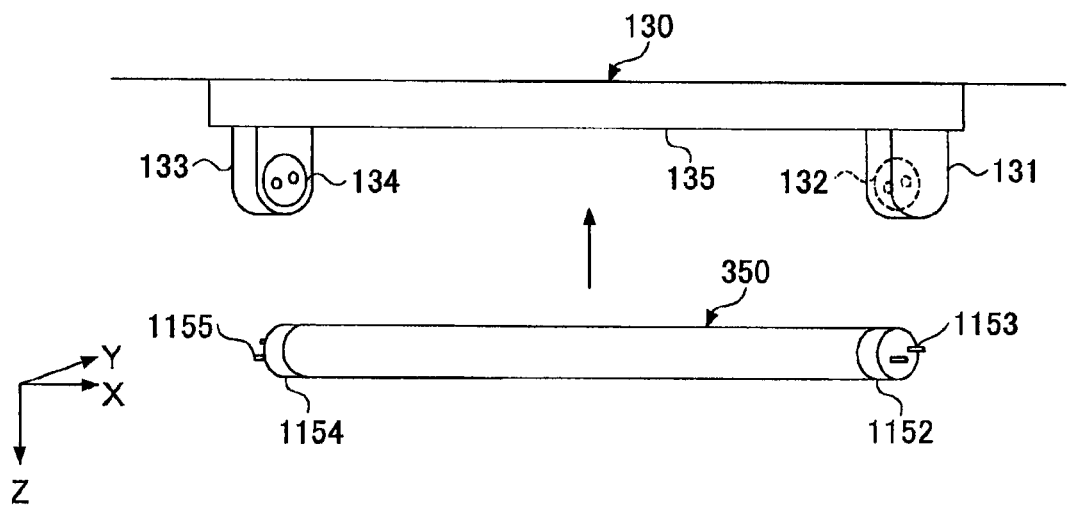
FIG. 25 illustrates an external appearance of a lighting fixture according to a third variant of the first embodiment.

Further, as shown in FIG. 25, it is also possible that the communication unit 350 is solely mounted in the lighting fixture body 130, in the same way as the case of the first embodiment shown in FIG. 4. This case is referred to as the third variant of the first embodiment.

Figure 26:
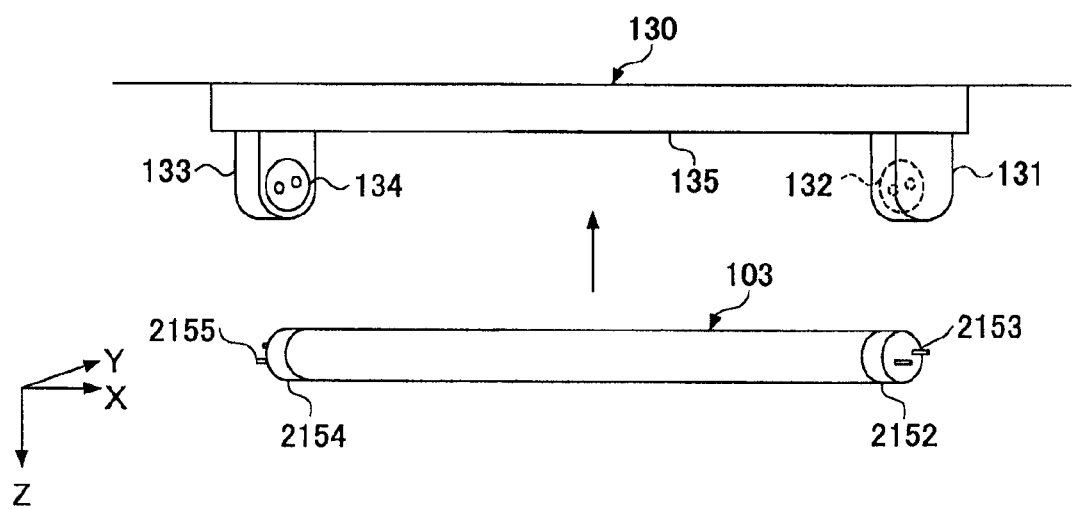
FIG. 26 illustrates an external appearance of a lighting fixture according to a fourth variant of the first embodiment.

Furthermore, as shown in FIG. 26, it is also possible that the lamp 103 is solely mounted in the lighting fixture body 130, in the same way as the case of the first embodiment shown in FIG. 4. This case is referred to as the fourth variant of the first embodiment.

Further, it is also possible that in the positional information management system 1 of FIG. 1, in each of the plurality of lighting fixtures, any one or any ones of the light device(s) 150, the communication unit(s) 350 and/or the lamp(s) 103 is(are) mounted in the lighting fixture body 130 or 1130. Thus, different types of the lighting fixtures, such as those of FIGS. 4, 23, 24, 25 and 26, may be mixed together in one positional information management system.

Further, the lighting fixture 100 according to the first embodiment may be an emergency light provided at an emergency exit or the like, for example.

Further, in a case where, as mentioned above, the positional information is transmitted using the wireless communication control part 210 and the wireless communication part 212, the positional signal transmission control part 206 and the positional signal transmission part 208 become unnecessary.

Figure 22:
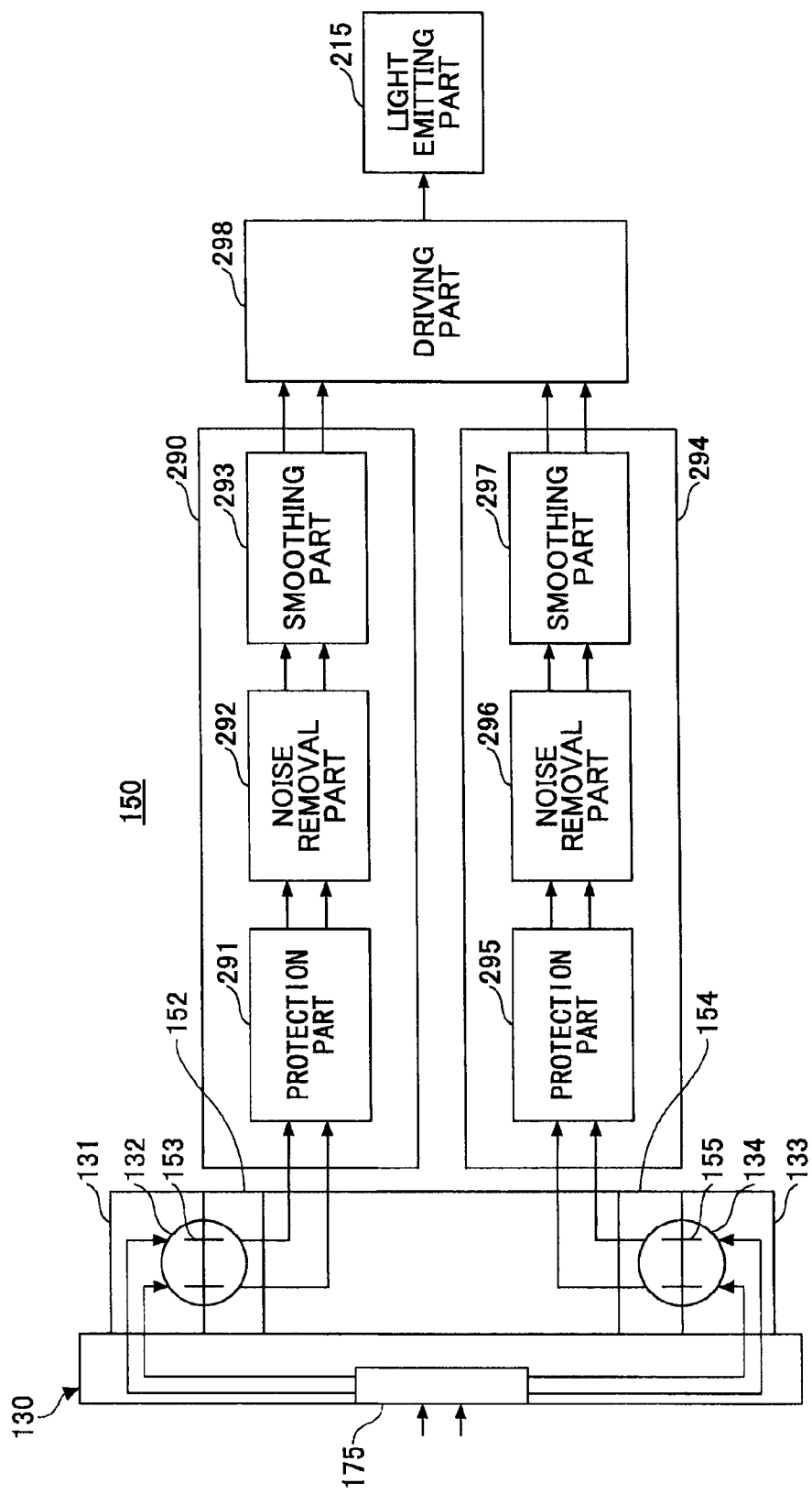
FIG. 22 shows a general block diagram of a driving circuit of the light device according to the first embodiment.

FIG. 22 is a general block diagram of a driving circuit of the light device 150 according to the first embodiment. As shown in FIG. 22, the driving circuit of the light device 150 includes a first power input part 290, a second power input part 294 and a driving part 298.

The first power input part 290 is connected to the connection terminal 153, and the power is supplied via a ballast 175 from the power supply terminal 132 of the first socket 131 of the lighting fixture body 130, and supplies direct-current power to the driving part 298 after removing noise from the power, smoothing and converting the power into the direct-current power. The second power input part 294 is connected to the connection terminal 155, and the power is supplied via the ballast 175 from the power supply terminal 134 of the second socket 133 of the lighting fixture body 130, and supplies direct-current power to the driving part 298 after removing noise from the power, smoothing and converting the power into the direct-current power. In the light device 150, the power can be supplied by any one of the first power input part 290 and the second power input part 294, and also, the power can be supplied thereto by both of the first power input part 290 and the second power input part 294 simultaneously.

It is noted that, for example, the ballast 175 shown in FIG. 22 is included in the power supply part 218 of the lighting fixture body 130 (see FIG. 5) or is provided in the lighting fixture body 130 between the power supply part 218 and the power output end of the lighting fixture body 130.

Further, the driving circuit shown in FIG. 22 (including the first and second power input parts 290, 294 and the driving part 298) corresponds to, for example, the power control part 216 of the light device 150 (see FIG. 5). In this case, the power is supplied to the voltage conversion part 214 of the light device 150 from, for example, any one or both of the first and second power input parts 290, 294 of the driving circuit shown in FIG. 22.

The first power input part 290 and the second power input part 294 have protection parts 291 and 295, noise removal parts 292 and 296, and smoothing parts 293 and 297, respectively. The protection parts 291 and 295 protect the driving part 298 and the light emitting part 215 by preventing abnormal power from being input. The noise removal parts 292 and 296 remove externally introduced surge and noise from the supplied power and then output the power. The smoothing parts 293 and 297 smooth the power input from the noise removal parts 232 and 296, convert the power into the direct-current power, and supply the power to the driving part 298.

The driving part 298 increases or reduces the voltage of the power output by the smoothing parts 293 and 297, and constantly supplies the current having the fixed magnitude to the light emitting part 215.

By the above-mentioned configuration as an example, in the light device 150, no power flows out from the other connection terminal even when the power is input from either one of the connection terminals 153 and 155. Thus, it is possible to prevent an electrical accident which could otherwise occur due to contact and therefore safely install the light device 150 without the need of special power supply installation work. Further, it is possible to provide a stable lighting function by protecting the light emitting part 215 by cutting off the noise and so forth from the input power.

Figure 8:
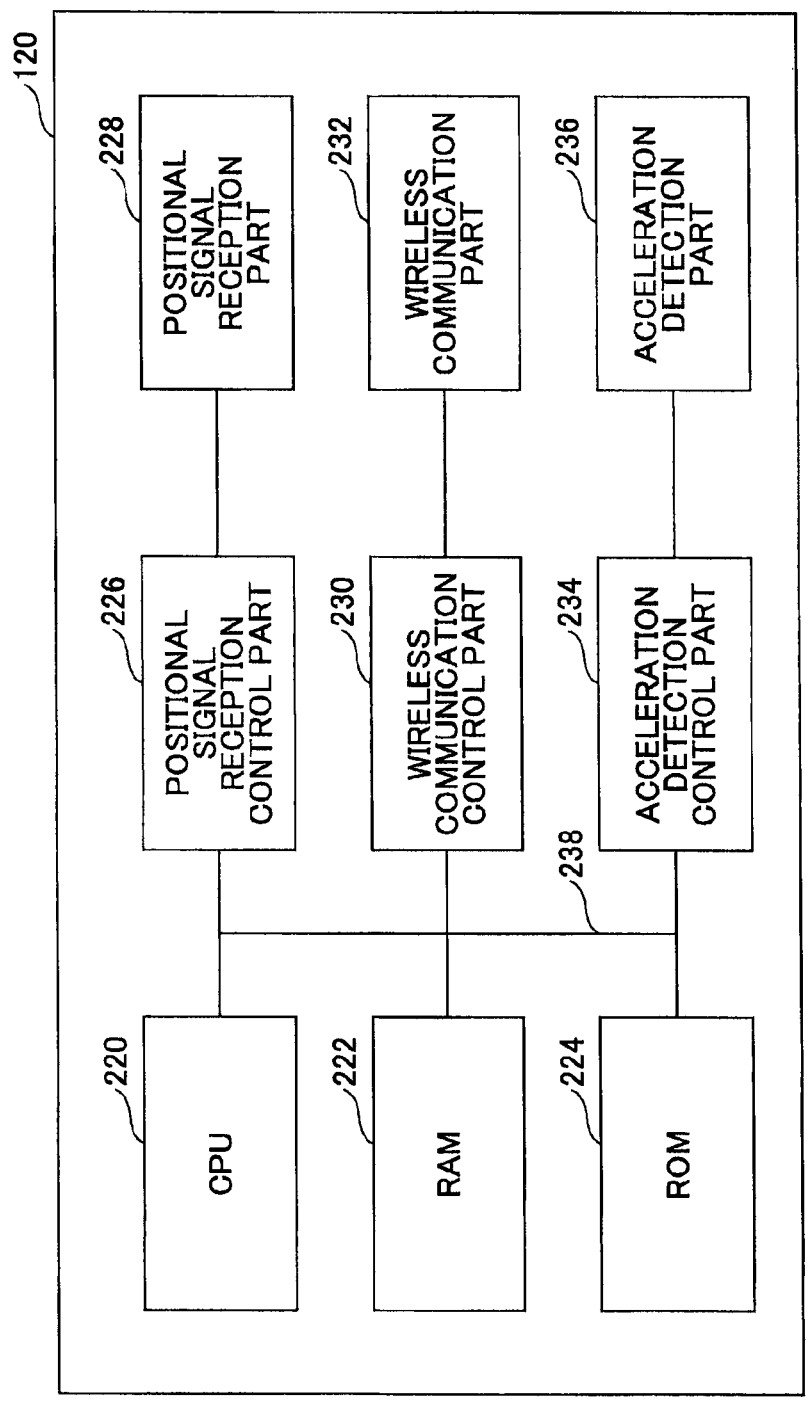
FIG. 8 is a hardware configuration diagram of a wireless terminal according to the first embodiment.

FIG. 8 shows a hardware configuration of the wireless terminal 120 according to the first embodiment, as a typical example of the wireless terminals 120, 122 and 124. Each of the other wireless terminals 122 and 124 has generally the same hardware configuration as the wireless terminal 120. The wireless terminal 120 includes, as shown, a CPU 220, a RAM 222, a ROM 224, a positional signal reception control part 226, a positional signal reception part 228, a wireless communication control part 230, a wireless communication part 232, an acceleration detection control part 234, an acceleration detection part 236 and a bus 238.

The CPU 220 executes a program prepared for carrying out control of the operations of the wireless terminal 120. The RAM 222 provides a work area for the CPU 220, or the like, and stores the positional information received from the lighting fixture 100. The ROM 224 stores the program that the CPU 220 executes and the identification information of the wireless terminal 120. The positional signal reception control part 226 carries out a process for receiving the positioning signal (positional signal) indicating the positional information of the lighting fixture 100 via the positional signal reception part 228. The positional signal reception part 228 is a device including an antenna for receiving the positioning signal such as an IMES signal (positional signal). The wireless communication control part 230 carries out a wireless communication process using the wireless communication part 232. The wireless communication part 232 is a device including an antenna capable of transmitting and receiving radio waves that meet IEEE 802.15.4 standard, for example. The acceleration detection control part 234 detects a change in the acceleration of the wireless terminal 120 via the acceleration detection part 236. The acceleration detection part 236 includes, for example, the acceleration sensor or a motion sensor that uses inertial force or magnetism. The bus 238 electrically connects these respective parts.

By the above-mentioned configuration, the wireless terminal 120 according to the first embodiment can receive the positional information from the lighting fixture 100 and transmit its own identification information together with the positional information to the lighting fixture 100. Especially, by carrying out the operation of receiving or transmitting in timing when the wireless terminal 120 is moved, it is possible to efficiently transmit the identification information and the positional information.

It is noted that in a case where the wireless terminal 120 is an information terminal such as a smartphone, a PC or the like, an input device such as a touch panel, a dial pad, a keyboard, a mouse and/or the like and a corresponding input control part for receiving the user's input may be provided. Further, a display device such as a display screen and a corresponding display control part may be provided.

Further, in a case where the wireless terminal 120 has a GPS antenna and a corresponding control part, the wireless terminal 120 can receive the positioning signal of IMES using the antenna. Thus, it is possible to adapt the wireless terminal 120 for the positional information management system 1 only by modifying the software.

Further, the acceleration detection control part 234 and the acceleration detection part 236 are optional parts. In a case where the acceleration detection control part 234 and the acceleration detection part 236 are not provided, the operation of receiving or transmitting of the wireless terminal 120 is carried out at predetermined time intervals or at a predetermined time of day.

Further, as mentioned above, in a case where the positional information is received using the wireless communication control part 230 and the wireless communication part 232, the positional signal reception control part 226 and the positional signal reception part 228 become unnecessary.

Figure 9:
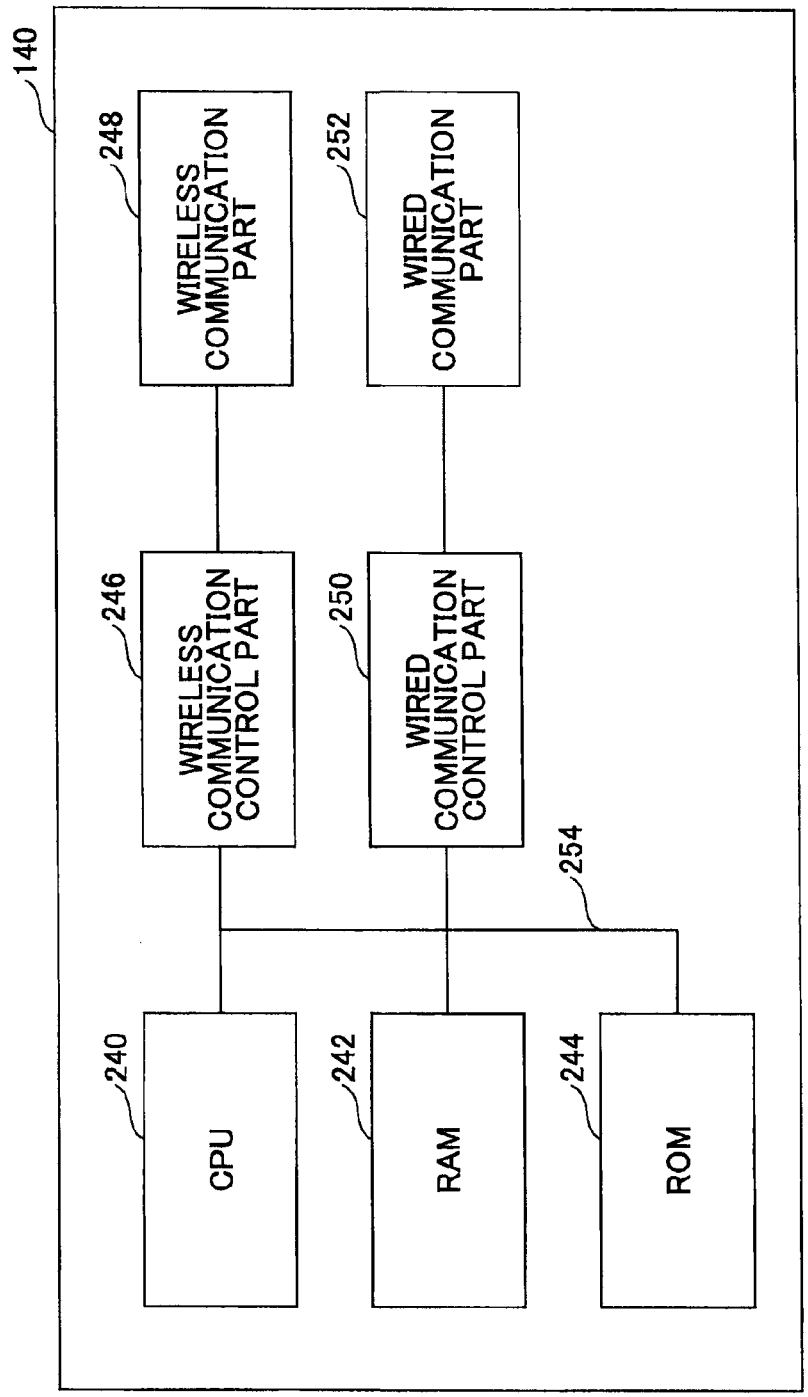
FIG. 9 is a hardware configuration diagram of a management apparatus according to the first embodiment.

FIG. 9 shows a hardware configuration of the management apparatus 140 according to the first embodiment. The management apparatus 140 includes a CPU 240, a RAM 242, a ROM 244, a wireless communication control part 246, a wireless communication part 248, a wired communication control part 250, a wired communication part 252 and a bus 254.

The CPU 240 executes a program prepared for carrying out control of the operations of the management apparatus 140. The RAM 242 provides a work area for the CPU 240, or the like. The ROM 244 stores the program that the CPU 240 executes and data that the CPU 240 uses when executing the program. The wireless communication control part 246 carries out a wireless communication process using the wireless communication part 248. The wireless communication part 248 is a device including an antenna capable of transmitting and receiving radio waves that meet IEEE 802.15.4 standard, for example. The wired communication control part 250 carries out a wired communication process using the wired communication part 252. The wired communication part 252 is a device having a network interface that meets IEEE 802.3 standard, for example. The bus 254 electrically connects these respective parts.

By the above-mentioned configuration, the management apparatus 140 can convert the signals received from the network 180 including the lighting fixtures 100, 102, 104 and 106 and the wireless terminals 120, 122 and 124 to the signals for the network 190 including the management server 160. Further, in a case where the network 180 forming the PAN meets ZigBee (registered trademark), the management apparatus 140 can have the coordinator function for managing the devices participating in the PAN.

Figure 10:
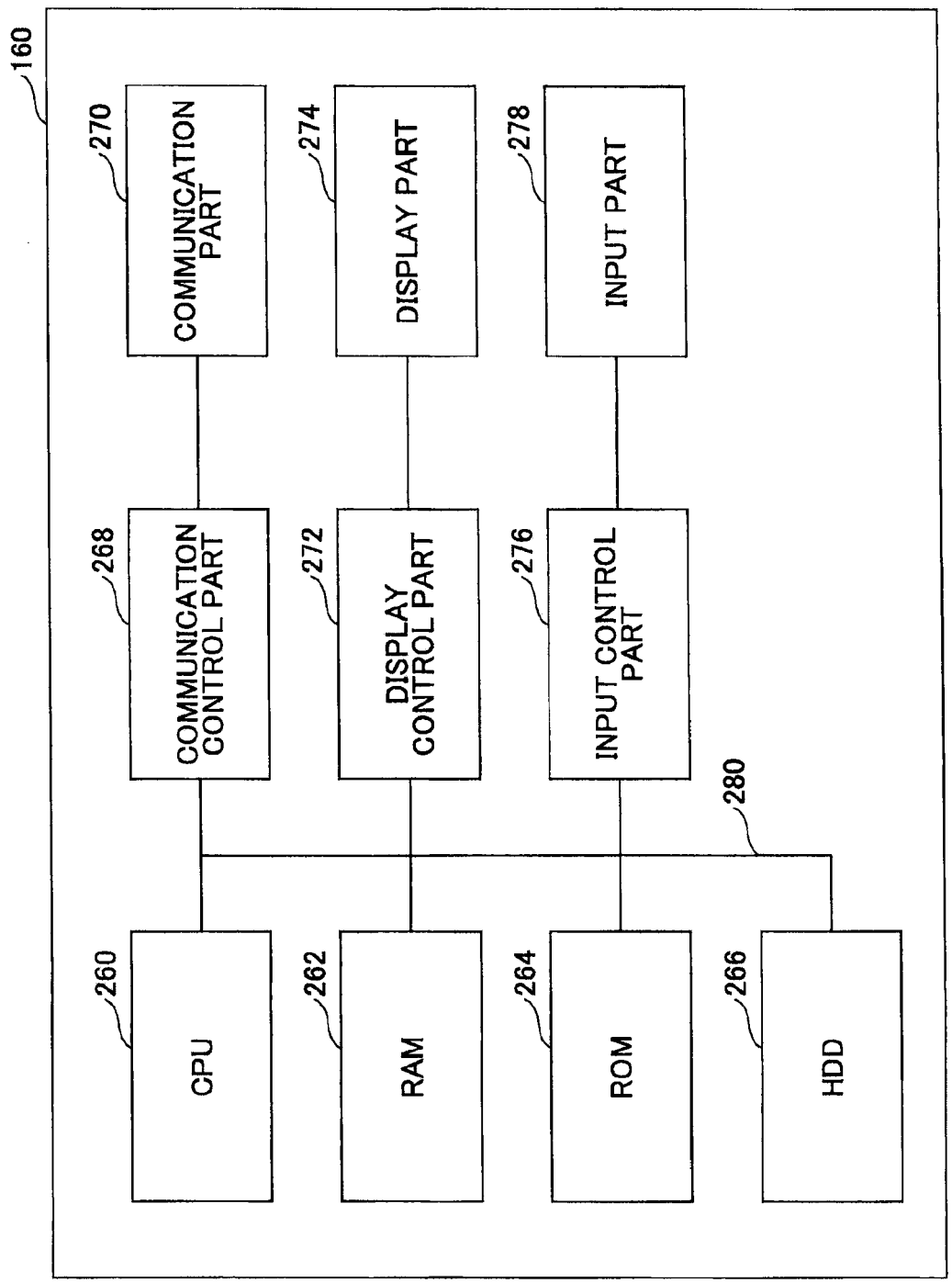
FIG. 10 is a hardware configuration diagram of a management server according to the first embodiment.

FIG. 10 shows a hardware configuration of the management server 160 according to the first embodiment. The management server 160 includes a CPU 260, a RAM 262, a ROM 264, a HDD 266, a communication control part 268, a communication part 270, a display control part 272, a display part 274, an input control part 276, an input part 278 and a bus 280.

The CPU 260 executes a program prepared for carrying out control of the operations of the management server 160. The RAM 262 provides a work area for the CPU 260, or the like. The ROM 264 stores the program that the CPU 260 executes and data that the CPU 260 uses when executing the program. The HDD 266 stores information to be used for managing the positions of the wireless terminals 120, 122 and 124 used in the positional information management system 1. The communication control part 268 carries out a communication process using the communication part 270. The communication part 270 is a device having a network interface that meets IEEE 802.3 standard, for example. The display control part 272 controls the contents to be displayed on the display part 274 according to the contents obtained from the process carried out by the CPU 260 that executes the program concerning the position management to be carried out by the management server 160. The display part 274 includes a display device such as a liquid crystal display device, a CRT display device or the like. The input control part 276 processes the signal given by the input part 278 such as a keyboard, a mouse and/or the like for receiving the user's input. The bus 280 electrically connects these respective parts.

By the above-mentioned configuration, the management server 160 according to the first embodiment can manage the locations (whereabouts) of the wireless terminals 120, 122 and 124 and search for the locations (whereabouts) of the wireless terminals 120, 122 and 124.

It is noted that the HDD 266 may be changed into any other type of storage device such as a tape drive, or a storage area accessible using a network.

Further, the management server 160 may include the wireless communication control part 246 and the wireless communication part 248 of the management apparatus 140, and carry out the processes of the wireless communication control part 246 and the wireless communication part 248, instead of the management apparatus 140. Thereby, it becomes unnecessary to separately provide the management apparatus 140.

(3. Function)

Figure 11:
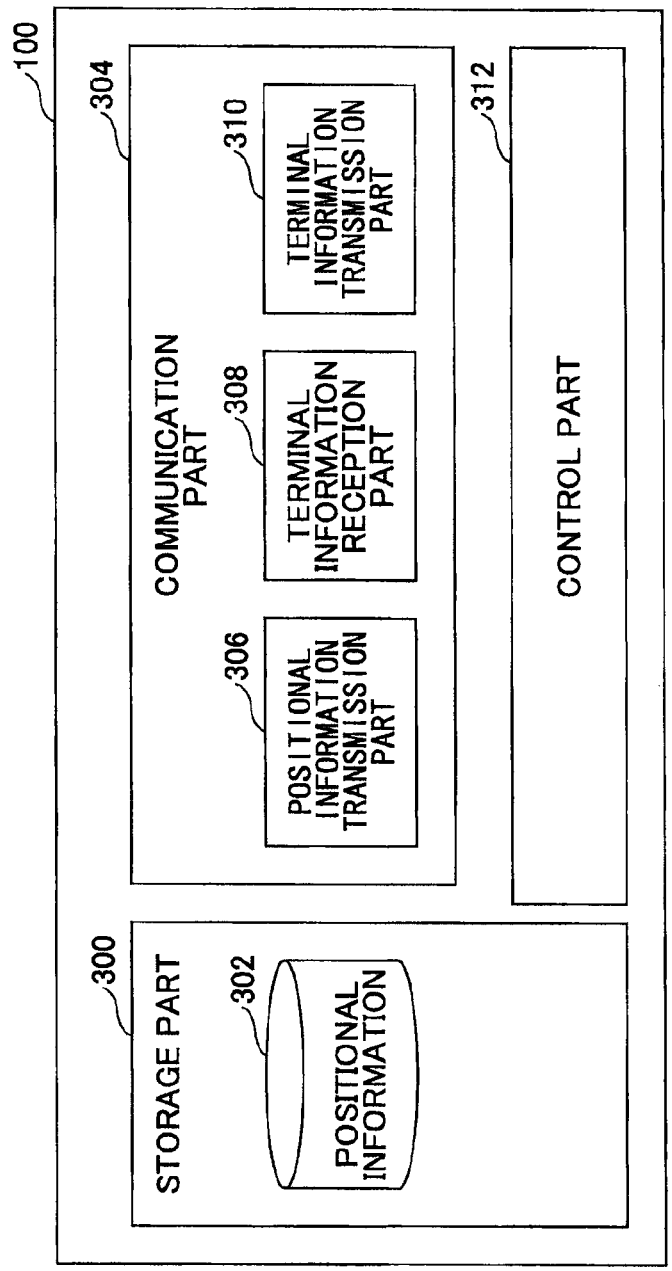
FIG. 11 is a functional block diagram of the lighting fixture according to the first embodiment.

FIG. 11 is a functional block diagram of the lighting fixture 100 according to the first embodiment, as a typical example of the lighting fixtures 100, 102, 104 and 106. Each of the other lighting fixtures 102, 104 and 106 has generally the same functional block configuration as the lighting fixture 100.

The light device 150 of the lighting fixture 100 includes a storage part 300, a communication part 304 and a control part 312.

The storage part 300 stores the positional information 302 of the light device 150. FIG. 15 shows one example of a table for storing the positional information 302. The table of FIG. 15 includes the respective items of "floor number", "latitude", "longitude" and "building number". The floor number denotes the floor number of the floor of the building on which the light device 150 (lighting fixture 100) is installed. The latitude and longitude denote the latitude and longitude of the position at which the light device 150 is placed. The building number denotes the number of the building in which the light device 150 is installed. In the example of FIG. 15, the light device 150 is placed on the sixteenth floor of one of certain buildings having the number "C", at the place of latitude "35.459555 and longitude "139.387110".

The communication part 304 includes a positional information transmission part 306, a terminal information reception part 308 and a terminal information transmission part 310.

The positional information transmission part 306 continuously or intermittently transmits, in a wireless manner, the positional information 302 including information such as the latitude and longitude information, the floor number of the building and the building number, to the wireless terminal 120 that exists within the predetermined area. The positional information 302 is thus transmitted using a format prescribed in IMES, for example. The positional information transmission part 306 is, for example, the above-mentioned positional signal transmitter 158 that the light device 150 has.

The terminal information reception part 308 receives the identification information and the positional information transmitted by the wireless terminal 120. The terminal information transmission part 310 then transmits the identification information and the position information transmitted by the wireless terminal 120 to the management server 160 via the management apparatus 140. In a case where the network 180 meets ZigBee (registered trademark) standard, the transmitting is carried out using the routing information that the light device 150 has. The terminal information reception part 308 and the terminal information transmission part 310 are, for example, the above-mentioned wireless communication device 159 that the light device 150 has.

The control part 312 controls the operations of the light device 150 of the lighting fixture 100. In a case where the light device 150 forms the PAN that meets the ZigBee (registered trademark) standard together with the light devices 150 of the other lighting fixtures 102, 104 and 106 and the wireless terminals 120, 122 and 124 and the management apparatus 140, the control part 312 carries out the control such that the light device 150 has the router function.

By the above-mentioned configuration, the lighting fixture 100 according to the first embodiment can have the positional information 302, transmit the positional information 302 to the wireless terminal 120, receive the identification information of the wireless terminal 120 and the positional information, and transmit the identification information and the positional information to the management server 160 via the management apparatus 140.

It is noted that the positional information 302 includes at least one of the latitude and longitude information of the light device 150; the floor information of the floor of the building on which the light device 150 is installed; and the building information of the building in which the light device 150 is installed. The positional information 302 may include, as the building information, additional information such as the name of the building in which the light device 150 is installed, information indicating one of divisions inside the room in which the light device 150 is installed, and/or the like. Thereby, it is possible to carry out more refined position management.

Figure 12:
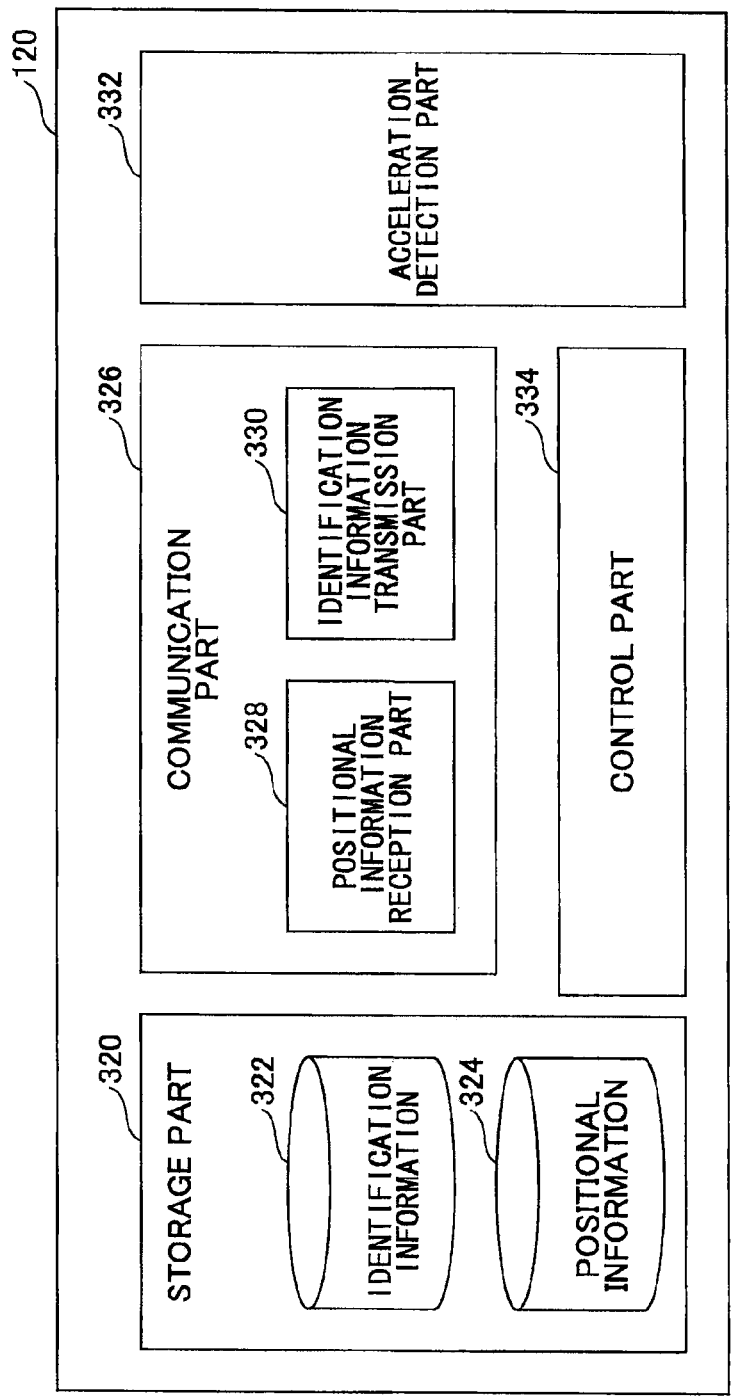
FIG. 12 is a functional block diagram of the wireless terminal according to the first embodiment.

FIG. 12 is a functional block diagram of the wireless terminal 120, as a typical example of the wireless terminals 120, 122 and 124 according to the first embodiment. Each of the other wireless terminals 122 and 124 has generally the same functional block configuration as the wireless terminal 120. The wireless terminal 120 according to the first embodiment includes a storage part 320, a communication part 326, an acceleration detection part 332 and a control part 334.

The storage part 320 includes the identification information 322 and the positional information 324. The identification information 322 includes information such as the network address of the wireless terminal 120 by which it is possible to identify the wireless terminal 120 in the positional information management system 1. For example, in a case where the network 180 meets the IEEE 802.15.4 and ZigBee (registered trademark) standards, it is possible to use the short address as specified in IEEE 802.15.4 or IEEE extended (MAC) address. The positional information 324 is the positional information 302 transmitted by the lighting fixture 100. FIG. 16 shows one example of a table for storing the positional information 324. The configuration of the table of FIG. 16 is the same as FIG. 15.

The communication part 326 includes a positional information reception part 328 and an identification information transmission part 330.

The positional information reception part 328 receives the positional information 302 transmitted by the lighting fixture 100. The received positional information 302 is stored in the storage part 320 of the wireless terminal 120 as the positional information 324.

The identification information transmission part 330 transmits the identification information 322 of the wireless terminal 120 itself and the positional information 324 together to the lighting fixture 100. The positional information 324 is transmitted using a format as shown in FIG. 17, for example. According to the format of FIG. 17, the respective fields of the floor number, the latitude, the longitude and the building number are expressed by 9 bits, 21 bits, 21 bits and 8 bits, respectively, and the format is such that the corresponding fields of the message received according to the IMES standard are connected together. The expression format in each field meets the IMES standard. Actually, in addition to the format of FIG. 17, a header and/or checksum information prescribed by the applied communication system are added, and then, the positional information 324 is transmitted. As the communication system, the IEEE 802.15.4 and ZigBee (registered trademark) standards are used, for example.

The acceleration detection part 332 detects a change in the acceleration of the wireless terminal 120. A change in the acceleration is thus detected, for example, at a time the wireless terminal 120 starts moving, at a time the wireless terminal 120 stops the moving, at a time an inclination of the wireless terminal 120 has been detected, and so forth.

For example, at a time when the wireless terminal 120 starts moving, the wireless terminal 120 is accelerated, and thus, the acceleration of the wireless terminal 120 is changed from zero to a positive value or from a positive value to zero accordingly. The acceleration detection part 332 detects such a change in the acceleration, and thus, determines that the wireless terminal 120 has started moving.

A change in the acceleration thus detected is used to determine timing of the operation of transmitting or receiving by the wireless terminal 120. It is noted that the acceleration detection part 332 is an optional part.

The control part 334 controls the timing of receiving the positional information by the positional information reception part 328, and the timing of transmitting the identification information 322 and the positional information 324 by the identification information transmission part 330. These timings of receiving and transmitting are determined based on the detection of a change of the acceleration of the wireless terminal 120 by the acceleration detection part 332. Alternatively, the timings of receiving and transmitting may be determined based on predetermined time intervals or a predetermined time of day, each of which is previously set in the wireless terminal 120. Further, the respective timings of receiving and transmitting may be determined separately. Further, in a case where the wireless terminal 120 forms the PAN that meets the ZigBee (registered trademark) standard together with the other wireless terminals 122 and 124 and the lighting fixtures 100, 102, 104 and 106 and the management apparatus 140, the control part 334 carries out control such that the wireless terminal 120 has the end device function.

By the above-mentioned configuration, the wireless terminal 120 according to the first embodiment can efficiently receive the positional information from the lighting fixture 100 and efficiently transmit the identification information together with the positional information to the lighting fixture 100.

It is noted that in a case where the wireless terminal 120 is an information terminal such as a smartphone or a PC, the wireless terminal 120 may include an input part for receiving the user's input and/or a display part for showing information to the user. Thereby, the wireless terminal 120 can show the identification information or the positional information to the user, or can receive an input or a change of the identification information or the positional information from the user.

Figure 13:
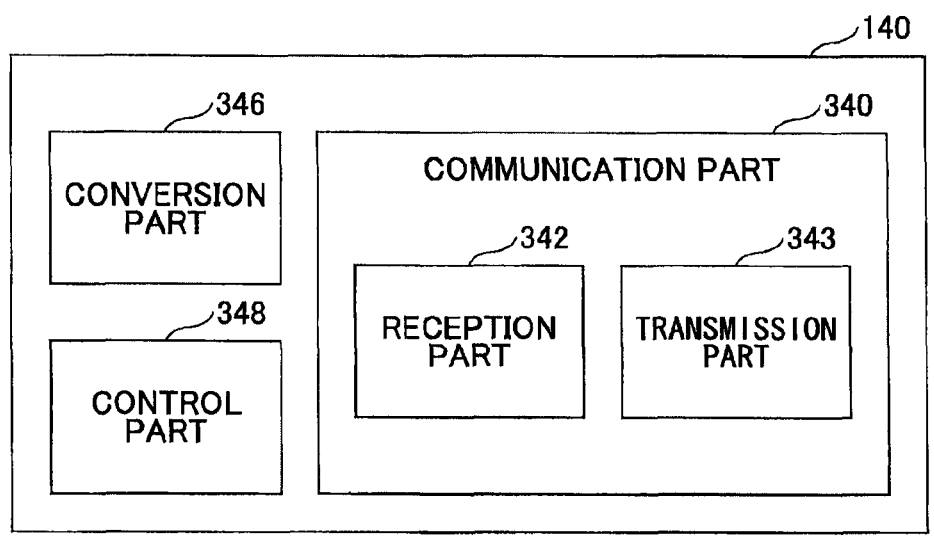
FIG. 13 is a functional block diagram of the management apparatus according to the first embodiment.

FIG. 13 is a functional block diagram of the management apparatus 140 according to the first embodiment. The management apparatus 140 according to the first embodiment includes a communication part 340, a conversion part 346 and a control part 348.

The communication part 340 includes a reception part 342 and a transmission part 344. The reception part 342 receives the data transmitted by the lighting fixtures 100, 102, 104 and 106 or the wireless terminals 120, 122 and 124, which belong to the network 180. The transmission part 344 transmits the data, which has been converted in the management apparatus 140, to the management server 160 that belongs to the network 190. The network 180 is, for example, the PAN that meets IEEE 802.15.4 and ZigBee (registered trademark) standards. The network 190 is, for example, the LAN that meets IEEE 802.3 standard.

The conversion part 346 converts the data received from the network 180 by the reception part 342 into a form suitable for the network 190. The data obtained from the conversion is then transmitted to the management server 160 via the network 190 by the transmission part 344. In a case where the identification information of the wireless terminal 120, 122 or 126 included in the data is expressed by the short address as specified in IEEE 802.15.4, the identification information is converted into the IEEE extended address based on the information used at the time of the configuring the PAN.

The control part 348 controls the operations of the management apparatus 140. In a case where the management apparatus 140 forms the PAN that meets the ZigBee (registered trademark) standard together with the lighting fixtures 100, 102, 104 and 106 and the wireless terminals 120, 122 and 124, the control part 348 carries out control such that the management apparatus 140 has the coordinator function.

By the above-mentioned configuration, the management apparatus 140 according to the first embodiment can bridge between the network 180 to which the lighting fixtures 100, 102, 104 and 106 and the wireless terminals 120, 122 and 124 belong and the network 190 to which the management server 160 belongs, for making it possible to carry out communication therebetween.

Figure 14:
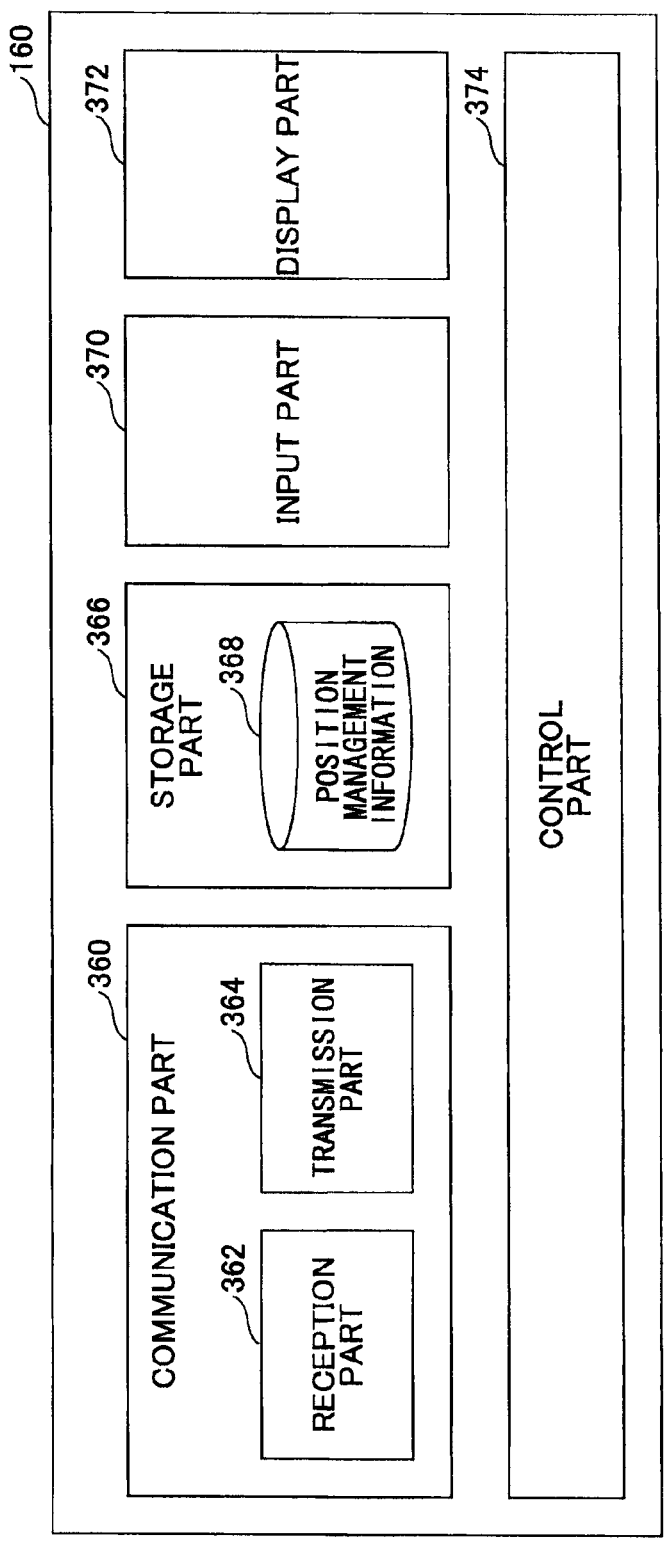
FIG. 14 is a functional block diagram of the management server according to the first embodiment.

FIG. 14 is a functional block diagram of the management server 160 according to the first embodiment. The management server 160 according to the first embodiment includes a communication part 360, a storage part 366, an input part 370, a display part 372 and a control part 374.

The communication part 360 includes a reception part 362 and a transmission part 364. The reception part 362 receives the identification information and the positional information transmitted from the wireless terminals 120, 122 and 124 via the management apparatus 140. The identification information and the positional information thus received are stored in the storage part 366. The transmission part 364 transmits the corresponding positional information to an external server or the like in a case where the positional information is requested by the external server or the like.

The storage part 366 has position management information 368. The position management information 368 is information obtained from adding management information such as the received date and time to the identification information and the positional information received from the wireless terminals 120, 122 and 124. FIG. 18 shows one example of a table for storing the position management information 368. The table of FIG. 18 has respective items of "identification information", "latitude", "longitude", "floor number", "building", "received date and time", "apparatus name" and "department". The item "identification information" is an item for the identification information such as the IEEE extended address of the wireless terminal 120, 122 or 124, which has transmitted the identification information. The respective items "latitude", "longitude", "floor number" and "building" ("building number") are items for those corresponding to the positional information received together with the identification information. The item "received date and time" is an item for information indicating the date and time at which the management server 160 has received the information. The item "apparatus name" is an item for information indicating the name of the management target to which the wireless terminal 120, 122 or 124, which has transmitted the information, is attached, or the apparatus name of the wireless terminal 120, 122 or 124, which has transmitted the information, itself. The item "department" is an item for information indicating the name of the department that has the wireless terminal 120, 122 or 124, which has transmitted the information. The information "apparatus name" and the information "department" are previously associated with the corresponding identification information by the management server 160.

The input part 370 receives the user's input so that the user can obtain the positional information (search for the position).

Figure 21:
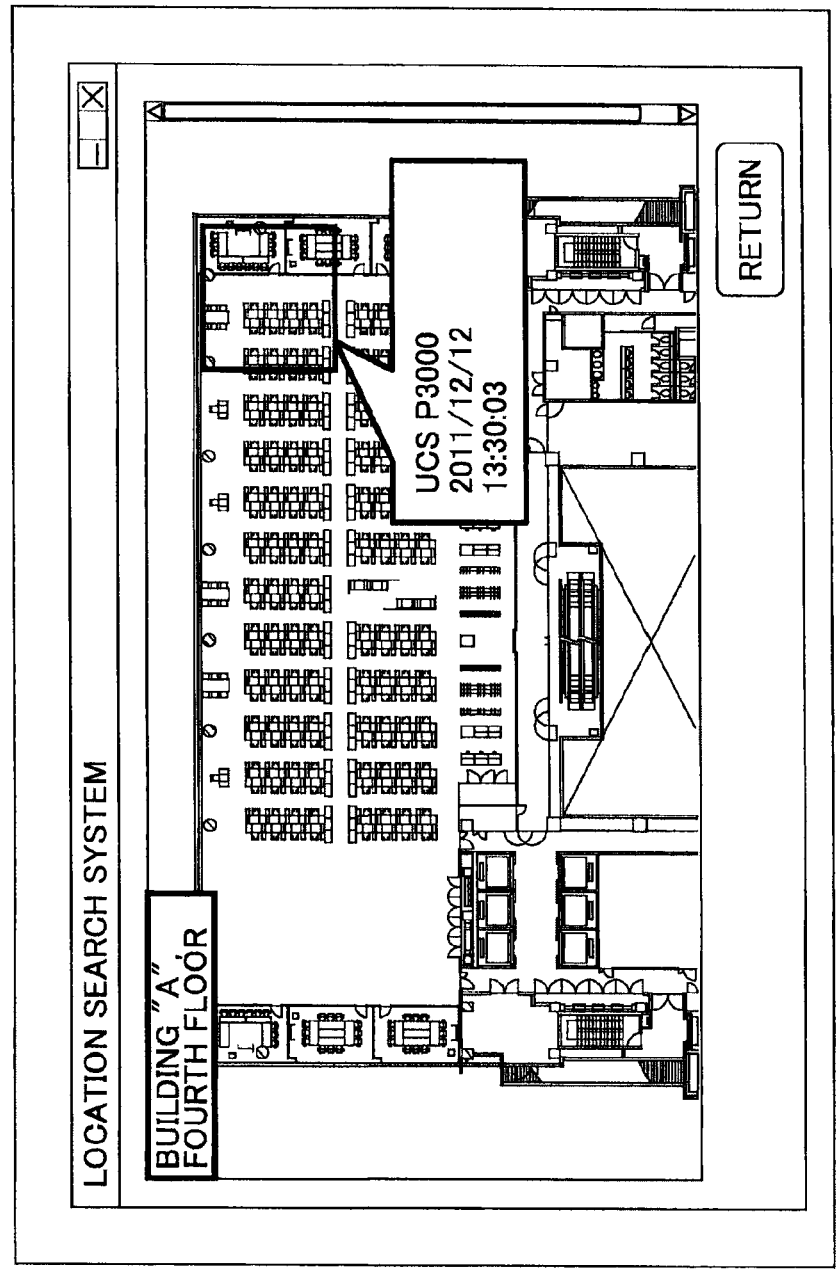
FIG. 21 shows an example of a search result screen page of the management server according to the first embodiment.

The display part 372 displays a GUI of a search screen page for the user to search for the position (obtain the positional information) on the display screen. FIG. 20 shows one example of the search screen page. According to a "location search system" shown in FIG. 20, a list of "departments" and "apparatus names" concerning the wireless terminals is displayed based on the information stored in the storage part 366. Then, when the user selects the check box of the apparatus to be searched for using the input part 370, a check mark is generated at the selected check box, as shown in FIG. 20. FIG. 20 shows one example in which the user wishes to carry out a search for the apparatus having the apparatus name "UCS P3000" that the "sales dept. 1" has. When the user presses a "search execution" button on the search screen page of FIG. 20 after the user has selected all the apparatuses to be searched for and the check marks have been generated at the corresponding check boxes accordingly, the corresponding search is carried out by the management server 160, and the search screen page is switched into a screen page showing a search result. FIG. 21 shows one example of the screen page of a search result. That is, when the "search execution" button has been pressed as mentioned above, the display part 372 displays the floor diagram of "building 'A'", fourth floor" on which "UCS P3000" is placed, the apparatus name "UCS P3000" and the received date and time "2011/12/12 13:30: 03", as shown in FIG. 21, based on the information stored in the storage part 366 (see FIG. 18).

The control part 374 controls the operations of the management server 160.

By the above-mentioned configuration, the management server 160 according to the first embodiment can manage the positions of the wireless terminals 120, 122 and 124, and search for the locations (whereabouts) thereof. Especially, the management server 160 can directly receive and manage the information itself which indicates the positions themselves of the wireless terminals 120, 122 and 124. Thus, it is possible to reduce the calculation amount required for searching for the positions.

It is noted that the management server 160 may have the same functions as those of the conversion part 346, the control part 348 and the reception part 342 that the management apparatus 140 has, and thus, have the same functions as those of the management apparatus 140. Thereby, it becomes unnecessary to separately provide the management apparatus 140.

Further, the position management information 368 stored by the management server 160 may include, in addition to the information shown in FIG. 18 or instead thereof, information that includes the date and time at which the wireless terminal 120, 122 or 124 has transmitted the information, the identifier of the light device 150 or the management apparatus 140 by which the information has been relayed, and/or the time period(s) or the transmission electric field strength(s) at the wireless terminal 120, 122 or 124 and/or the light device 150 required until the information has arrived at the management server 160. Thereby, it is possible to manage the positional information under more detailed conditions.

Further, the management server 160 may store the past positional information of the wireless terminals 120, 122 and 124. Thereby, it is possible to track the movements of the wireless terminals 120, 122 and 124.

(4. Operational Sequence)

Figure 19:
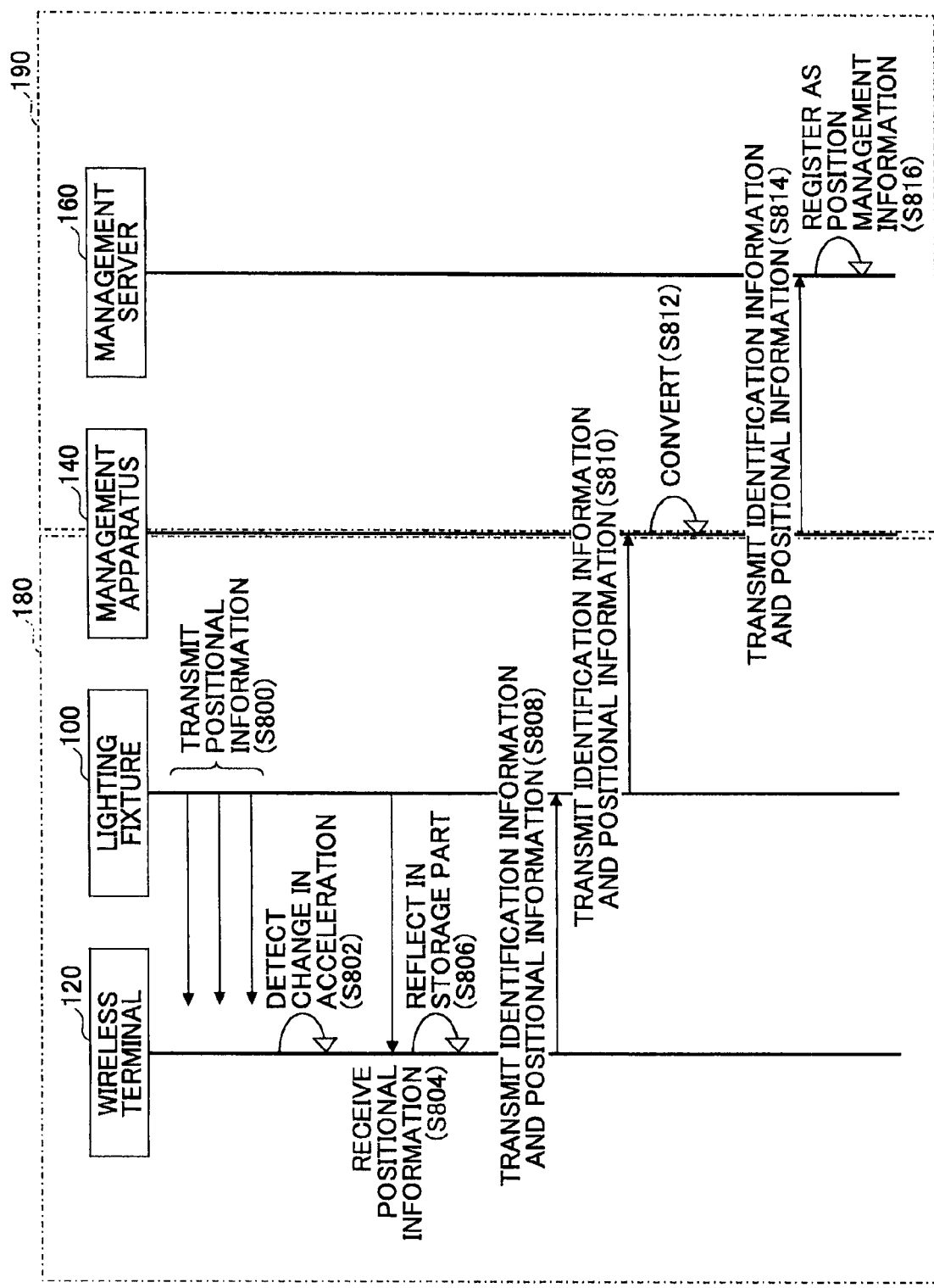
FIG. 19 shows an operational sequence of the positional information management system according to the first embodiment.

FIG. 19 shows an operational sequence of the positional information management system 1 according to the first embodiment of FIG. 1. Using FIG. 19, an example will be described in which the positional information management system 1 includes the wireless terminal 120 that receives the positional information when having detected a change in the acceleration of the wireless terminal 120, and transmits the identification information; the lighting fixture 100 that transmits the positional information to the zone to which the wireless terminal 120 belongs; the management apparatus 140 that bridges between the PAN (IEEE 802.15.4 and ZigBee (registered trademark)) and the LAN (IEEE 802.3); and the management server 160. Further, it is assumed that the PAN between the lighting fixture 100, the wireless terminal 120 and the management apparatus 140 has already been configured.

In step S800, the lighting fixture 100 continuously or intermittently transmits the positional information using IMES or the like.

In step S802, the wireless terminal 120 detects a change in the acceleration of the wireless terminal 120.

In step S804, the wireless terminal 120 receives the positional information transmitted by the lighting fixture 100.

In step S806, the wireless terminal 120 stores the received positional information.

In step S808, the wireless terminal 120 transmits the identification information and the positional information to the lighting fixture 100.

In step S810, the lighting fixture 100 transmits the identification information and the positional information, received from the wireless terminal 120, to the management apparatus 140 via the minimum path (route).

In step S812, the management apparatus 140 converts the data transmitted from the network 180, including the identification information and the positional information received from the lighting fixture 100, into a form suitable for the network 190.

In step S814, the management apparatus 140 transmits the identification information and the positional information, converted into the form suitable for the network 190, to the management server 160.

In step S816, the management server 160 registers the identification information and the positional information received from the management apparatus 140 together with the information of the wireless terminal 120 corresponding to the identification information.

By this procedure, in the positional information management system 1, the wireless terminal 120 efficiently transmits the identification information and the positional information to the nearest lighting fixture 100, and thus, it is possible to reduce the power consumption of the wireless terminal 120.

It is noted that, as described above, it is possible to integrate the functions of the management apparatus 140 into the management server 160 so that the management server 160 also carries out the functions of the management apparatus 140. In this case, it becomes unnecessary to install the separate management apparatus 140.

Further, in a case where the wireless terminal 120 does not have the acceleration detection part 332, step S802 is not carried out, and the receiving of the positional information in step S804 can be carried out at a predetermined time of day or at predetermined time intervals. The process thereafter is the same as steps S806 to S816.

According to the embodiment, it is possible to provide the light device by using which it is possible to efficiently carry out positional information management.

Although the embodiments of the light device, the communication unit and the positional information management system have been described, the present invention is not limited to the specifically disclosed embodiments, and variations and modifications may be made without departing from the scope of the present invention.

The present application is based on and claims the benefit of priority of Japanese Priority Application No. 2012-133297 filed on Jun. 12, 2012, the entire contents of which are hereby incorporated herein by reference.

What is claimed is:

1. A positional information management system comprising:
    a plurality of light devices configured to irradiate light and store positional information of the plurality of light devices;
    a plurality of communication units configured to store positional information of the communication units;
    a plurality of light sources configured to irradiate light without any associated communication capability;
    a plurality of lighting fixtures configured to mount therein any one of the plurality of light devices, the plurality of communication units and the plurality of light sources;
    a wireless terminal configured to receive the positional information from the plurality of light devices and communication units, and configured to transmit the received positional information and identification information of the wireless terminal to the corresponding light devices and communication units; and
    a management server configured to receive the positional information and the identification information from the plurality of light devices and communication units, and configured to manage a position of the wireless terminal; wherein
    each of the plurality of light devices, communication units, and light sources is a separate unit from remaining ones of the plurality of light devices, communication units and light sources,
    at least two different ones of the plurality of lighting fixtures have varying number of receiving sockets for receiving one of the plurality of light devices, communication units and light sources, or a combination of two of the plurality of light devices, communication units and light sources,
    the positional management information system has at least one of each of the at least two different ones of the plurality of lighting fixtures used therein to mount two or more of the plurality of light devices, communication units and light sources,
    and
    the plurality of light devices include,
        a positional information transmission part configured to transmit the positional information to the wireless terminal;
        a terminal information reception part configured to receive the identification information of the wireless terminal and the positional information from the wireless terminal that has received the positional information;
        a terminal information transmission part configured to transmit the identification information and the positional information to the management server; and
        a voltage conversion part configured to convert a voltage of a power supplied from an external power source, and supply the power to the positional information transmission part, the terminal information reception part and the terminal information transmission part.

2. The positional information management system as claimed in claim 1, wherein the management server is configured to manage the positional information of the light device and the identification information of the wireless terminal device to be associated with each other to provide information indicating that the position of the wireless terminal corresponds to a position of the light device.

* * * * *